United States Patent
Abe et al.

(10) Patent No.: US 8,000,361 B2
(45) Date of Patent: Aug. 16, 2011

(54) LASER SYSTEM

(75) Inventors: Tamotsu Abe, Hiratsuka (JP); Hideo Hoshino, Hiratsuka (JP); Akira Endo, Tokyo (JP); Osamu Wakabayashi, Hiratsuka (JP); Kouji Kakizaki, Hiratsuka (JP)

(73) Assignees: Komatsu Ltd., Tokyo (JP); Gigaphoton Inc., Tokyo (JP)

( * ) Notice: Subject to any disclaimer, the term of this patent is extended or adjusted under 35 U.S.C. 154(b) by 156 days.

(21) Appl. No.: 12/382,109

(22) Filed: Mar. 9, 2009

(65) Prior Publication Data
US 2009/0232171 A1    Sep. 17, 2009

(30) Foreign Application Priority Data

Mar. 12, 2008  (JP) ................. 2008-062082

(51) Int. Cl.
*H01S 3/00* (2006.01)
*H01S 3/22* (2006.01)
(52) U.S. Cl. ......... 372/38.02; 372/38.1; 372/55; 372/57
(58) Field of Classification Search ............ 372/38.1, 372/38.02, 55, 57, 29.02, 30; 250/504 R
See application file for complete search history.

(56) References Cited

U.S. PATENT DOCUMENTS

| | | | |
|---|---|---|---|
| 7,439,530 B2 | 10/2008 | Ershov et al. | |
| 2005/0265407 A1* | 12/2005 | Braun et al. | 372/30 |
| 2007/0001131 A1* | 1/2007 | Ershov et al. | 250/503.1 |
| 2008/0181268 A1* | 7/2008 | Dubois et al. | 372/30 |

OTHER PUBLICATIONS

V.A. Adamovich et al., "*TIR-1 Carbon Dioxide Laser System for Fusion*", Optical Society of America, 1980, pp. 313-318, Reprinted from Applied Optics, vol. 19(6), 918-923 (Mar. 1980).

* cited by examiner

*Primary Examiner* — Minsun Harvey
*Assistant Examiner* — Phillip Nguyen
(74) *Attorney, Agent, or Firm* — McDermott Will & Emery LLP

(57) ABSTRACT

The higher efficiency and lower power consumption are realized in a laser system for generating a high-power short-pulse laser beam. The laser system includes a laser oscillator for generating a pulse laser beam by laser oscillation, plural amplifiers for sequentially inputting the pulse laser beam generated by the laser oscillator and amplifying the pulse laser beam, and a control unit for controlling the laser oscillator to perform burst oscillation and halting an amplification operation of at least one of the plural amplifiers in a burst halt period between burst oscillation periods.

25 Claims, 20 Drawing Sheets

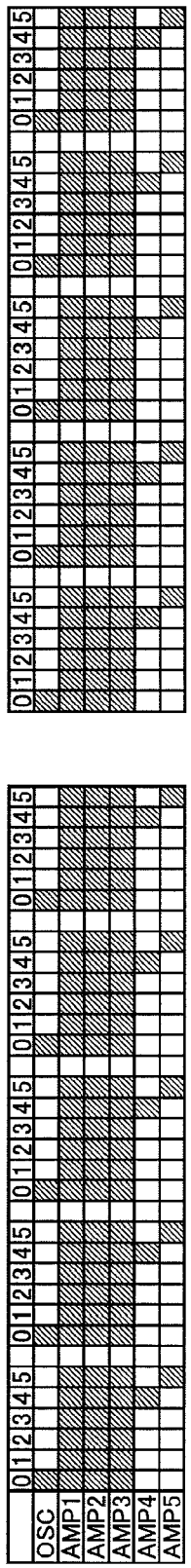
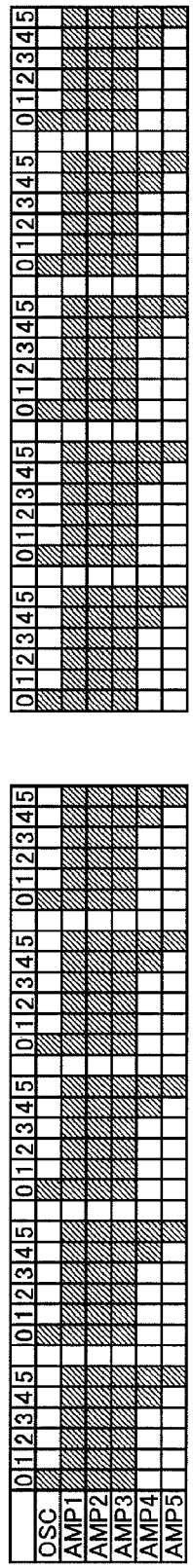
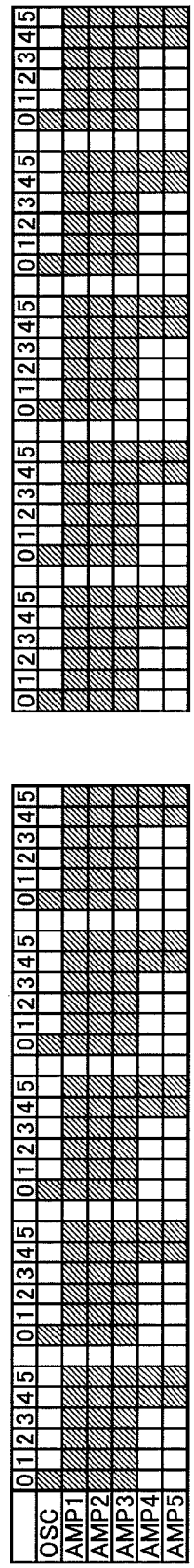
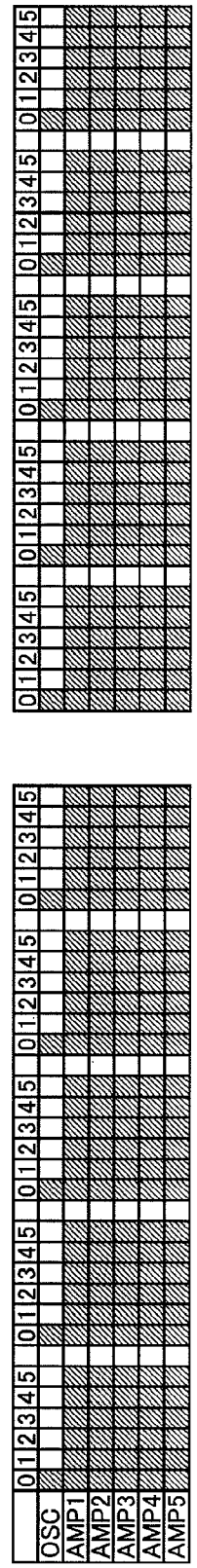
FIG. 9

LASER SYSTEM

BACKGROUND OF THE INVENTION

1. Field of the Invention

The present invention generally relates to a laser system for generating a short-pulse high-power laser beam, and specifically to a driver laser system for applying a laser beam to a target in an LPP (laser produced plasma) type EUV (extreme ultra violet) light source apparatus for generating extreme ultra violet light to be used for exposure of semiconductor wafers or the like.

2. Description of a Related Art

In recent years, as semiconductor processes become finer, photolithography has been making rapid progress to finer fabrication. In the next generation, microfabrication of 100 nm to 45 nm, further, microfabrication of 32 nm or less will be required. Accordingly, in order to fulfill the requirement for microfabrication of 32 nm or less, for example, exposure equipment is expected to be developed by combining an EUV light source generating EUV light having a wavelength of about 13 nm and reduced projection reflective optics.

As the EUV light source, there are three kinds of light sources, which include an LPP (laser produced plasma) light source using plasma generated by applying a laser beam to a target (hereinafter, also referred to as "LPP type EUV light source apparatus"), a DPP (discharge produced plasma) light source using plasma generated by discharge, and an SR (synchrotron radiation) light source using orbital radiation. Among them, the LPP light source has advantages in that extremely high intensity close to black body radiation can be obtained because plasma density can be considerably made larger, that the light emission of only the necessary waveband can be performed by selecting the target material, and that an extremely large collection solid angle of $2\pi$ steradian can be ensured because it is a point light source having substantially isotropic angle distribution and there is no structure surrounding the light source such as electrodes. Therefore, the LPP light source is considered to be predominant as a light source for EUV lithography requiring power of more than several tens of watts.

Here, a principle of generating EUV light in the LPP type EUV light source apparatus will be explained. By applying a laser beam to a target material supplied into a vacuum chamber, the target material is excited and turned into plasma. Various wavelength components including EUV light are radiated from the plasma. Then, the EUV light is reflected and collected by using an EUV collector mirror for selectively reflecting a desired wavelength component (e.g., a component having a wavelength of 13.5 nm), and outputted to an exposure unit. For the purpose, on a reflecting surface of the EUV collector mirror, a multilayer film with alternately stacked molybdenum (Mo) and silicon (Si) (Mo/Si multilayer film) is formed.

As an EUV light source that can generate EUV light with high efficiency, an LPP type EUV light source apparatus for applying a laser beam generated by a $CO_2$ laser to a tin (Sn) target has been proposed, and technology developments are centered on the apparatus. At present, the required output of the EUV light source apparatus in the immediate future is 140 W, and even in the LPP type EUV light source apparatus with a combination of the $CO_2$ laser and the tin target, the output as EUV light that can be used for exposure is about 1% to 4% of the laser output. Accordingly, in the case of the LPP type EUV light source apparatus having an output of 140 W, the laser output of about 10 kW or more, for example, is necessary. Further, the case where the sensitivity of the resist necessary for exposure becomes lower is envisioned, and the output of the EUV light source apparatus of about 300 W may be necessary. In this case, the laser output of 20 kW to 30 kW may be necessary.

For industrial use, a $CO_2$ laser having an output of 20 kW is commercially available, and this is a CW (continuous wave) laser for continuously outputting a laser beam. On the other hand, for EUV generation, a short-pulse $CO_2$ laser for outputting a pulse laser beam having a pulse width of about 10 ns to 100 ns is necessary. A high-power short-pulse $CO_2$ laser is not commercially available, and thus, a high-power driver laser system is realized by using a low-power short-pulse $CO_2$ laser as a laser oscillator and amplifying the output of the laser oscillator with plural amplifiers.

As an example of a $CO_2$ laser system for outputting high pulse energy, V. A. Adamovich et al., "TIR-1 carbon dioxide laser system for fusion", Optical Society of America, 1980, pp. 313-318, Reprinted from Applied Optics, Vol. 19(6), 918-923 (March, 1980) discloses a $CO_2$ laser system for fusion. The laser oscillator is a TEA $CO_2$ laser and generates a pulse laser beam by high-voltage pulse discharge. The pulse laser beam is amplified by multiple TEA $CO_2$ laser amplifiers by synchronizing discharge of the TEA $CO_2$ laser amplifiers with the pulse laser beam.

Further, as a related technology, U.S. Pat. No. 7,439,530 B2 (page 6, FIG. 8) discloses a schematic diagram showing a configuration of a driver laser system of an EUV light source apparatus as shown in FIG. 20. As shown in FIG. 20, the driver laser system 200 includes a laser oscillator (OSC) 210 for generating a short-pulse laser beam and three $CO_2$ laser amplifiers (AMP) 221-223 for amplifying the laser beam generated by the laser oscillator 210. As disclosed, the higher power is obtained by amplifying the pulse laser beam outputted from the laser oscillator 210 with the multiple laser amplifiers 221-223. The amplified pulse laser beam 6 outputted from the laser amplifier 223 is collected by a collective optics 2 on the target to generate EUV light 8.

SUMMARY OF THE INVENTION

As a repetition frequency of the $CO_2$ laser system as a driver laser of the EUV light source apparatus, about 50 kHz to 100 kHz is required. For realization of the number of repetitions, in the multiple amplification system using the TEA $CO_2$ lasers, the output energy is reduced due to the influence of the acoustic waves by the highly repeated discharge, or the collection performance of the beam is deteriorated even if the output energy is not reduced, and therefore, it is difficult to collect the beam to the target material with high energy density.

As means for increasing the repetition frequency, the laser oscillator may be formed by a laser oscillator mirror, a Q-switch, and a $CO_2$ laser medium, and by driving the Q-switch, a pulse laser beam with a short-pulse (several tens of nanoseconds) and high-repetition frequency can be outputted. In multiple $CO_2$ laser amplifiers for amplifying the pulse laser beam, the configuration is employed that causes a pair of electrodes to perform constant high-frequency discharge for exciting the $CO_2$ laser gas. As a result, a laser beam advantageous in collection performance can be amplified. However, in the case of this system, a new problem arises that the power consumption of the laser becomes greater.

As below, an amplification operation of a driver laser system using $CO_2$ lasers according to high-frequency discharge as amplifiers will be explained. In the driver laser system, the respective amplifiers are constantly in the excited condition at amplification operations, and the time when the gains for amplification exist is long. For example, in the case where a laser beam having a pulse width of 20 ns and a repetition frequency of 100 kHz is amplified, the period for amplification using the gains is only 20 ns in one cycle of 10 µs. Although the gains temporarily become lower due to amplification of the laser beam and the time of about 1 µs to 1.5 µs is taken until the gains return to the values before amplification, most of the amplification gains are unnecessary and do not contribute to amplification operations.

FIG. 21 shows changes in amplification gains over time in the driver laser system. In FIG. 21, the vertical axes indicate gains of the amplifiers or intensity of beam to be amplified, and the horizontal axes indicate time. Here, for easy explanation, it is assumed that a laser beam is amplified by two amplifiers AMP 1 and AMP 2.

In the AMP 1, the gain that can be used for amplification of laser beam constantly exists at non-amplification time. When a laser beam enters the AMP 1, the gain of the AMP 1 temporarily becomes lower due to the amplification operation. In the AMP 2, the same phenomenon also occurs with a delay. The reduced gains recover within one cycle (e.g., 10 µs), and the AMP 1 and AMP 2 perform the next amplification. However, the unnecessary gains exist between the recover of the gains and the next amplification. The input power therefor can not be taken out as laser beam energy.

For example, in the case where a driver laser system for EUV light source having an output of 20 kW is realized, a significant problem of power consumption emerges. Even when a relatively high-efficiency $CO_2$ laser is used, in the driver laser system for EUV light source which system amplifies a pulse laser beam, the plug-in efficiency is about 1%. That is, in order to obtain the laser output of 20 kW, electric power of 2000 kVA is necessary. This is comparable to the total power consumption of a medium-scale factory. When the driver laser system is introduced, the contracted receiving power capacity must be increased and, in some cases, an additional transformation installation or updating of the existing transformation installation may be necessary. This strongly hinders the introduction of EUV light sources into the market.

The present invention has been achieved in view of the above-mentioned circumstances. A purpose of the present invention is to realize higher efficiency and lower power consumption in a laser system for generating a short-pulse high-power laser beam.

In order to accomplish the above purpose, a laser system according to a first aspect of the present invention includes a laser oscillator for generating a pulse laser beam by laser oscillation, plural amplifiers for sequentially inputting the pulse laser beam generated by the laser oscillator and amplifying the pulse laser beam, and control means for controlling the laser oscillator to perform burst oscillation and halting an amplification operation of at least one of the plural amplifiers in a burst halt period between burst oscillation periods.

Further, a laser system according to a second aspect of the present invention includes a laser oscillator for generating a pulse laser beam by laser oscillation, plural amplifiers for sequentially inputting the pulse laser beam generated by the laser oscillator and amplifying the laser beam, and control means for controlling the laser oscillator to perform repeated oscillation and halting an amplification operation of at least one of the plural amplifiers in an oscillation halt period between repeated oscillation periods.

According to the first aspect of the present invention, by halting an amplification operation of at least one of the plural amplifiers in a burst halt period between burst oscillation periods, the higher efficiency and the lower power consumption can be realized in the laser system. Further, according to the second aspect of the present invention, by halting an amplification operation of at least one of the plural amplifiers in an oscillation halt period between repeated oscillation periods, the higher efficiency and the lower power consumption can be realized in the laser system.

BRIEF DESCRIPTION OF THE DRAWINGS

FIGS. 6-11 show an example of operation timing of the driver laser system shown in FIG. 2;

DESCRIPTION OF THE PREFERRED EMBODIMENTS

Figure 1:
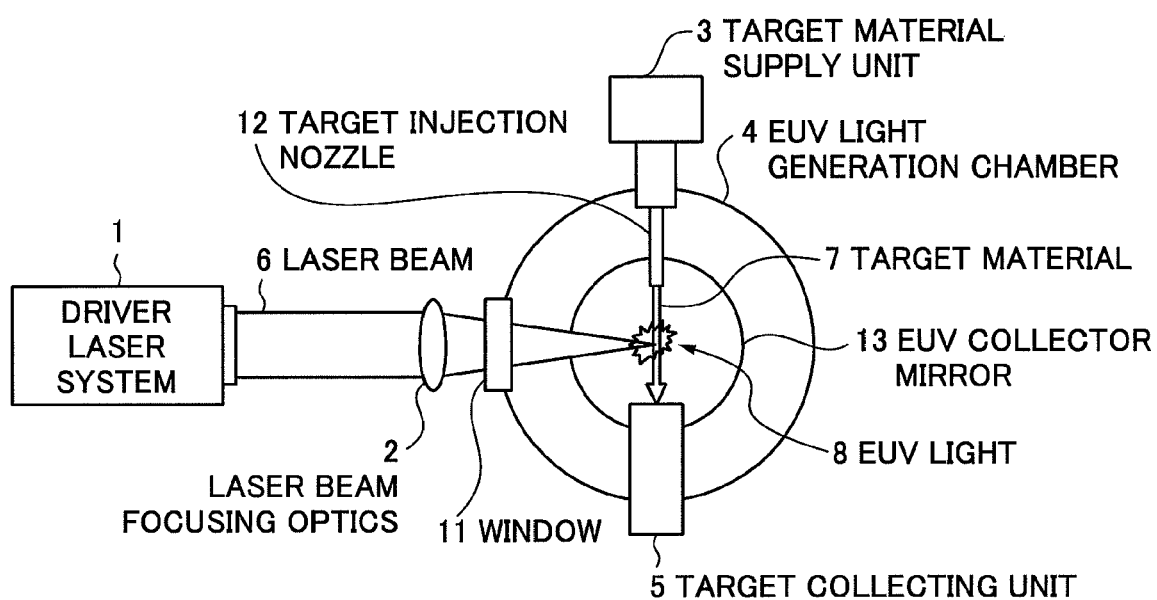
FIG. 1 is a schematic diagram showing an overview of an LPP type EUV light source apparatus to which a driver laser system according to embodiments of the present invention is applied.

Hereinafter, preferred embodiments of the present invention will be explained in detail by referring to the drawings. In the following embodiments, the cases where the present invention is applied to a driver laser system for applying a laser beam to a target in an LPP type EUV light source apparatus will be explained. The same reference characters are assigned to the same component elements and the description thereof will be omitted.

FIG. 1 is a schematic diagram showing an overview of an LPP type EUV light source apparatus to which a driver laser system according to embodiments of the present invention is applied. As shown in FIG. 1, the EUV light source apparatus includes a driver laser system 1, a laser beam focusing optics 2, a target material supply unit 3, an EUV light generation chamber 4, and a target collecting unit 5.

The driver laser system 1 is an oscillation and amplification type laser apparatus for generating a laser beam to be used for exciting the target material to drive the EUV light source apparatus. The configuration of the driver laser system 1 will be explained in detail later.

The laser beam focusing optics 2 includes at least one lens and/or at least one mirror, and focuses a pulse laser beam 6 generated by the driver laser system 1 to form a focal point on an orbit of the target material 7. Thereby, the target material 7 is excited and turned into plasma and EUV light 8 is generated.

The target material supply unit 3 supplies the target material 7 to be used for generation of the EUV light 8 into the EUV light generation chamber 4 via a target injection nozzle 12 as a part of the target material supply unit 3. Among the supplied target material 7, the unnecessary material to which the laser beam has not been applied is collected by the target collecting unit 5. As the target material, various known materials (e.g., tin (Sn), xenon (Xe), or the like) may be used.

The state of the target material may be gas, liquid, or solid, and the target material may be supplied to a space within the EUV light generation chamber 4 in any known form such as continuous flow (target jet) or droplets. For example, when a liquid xenon (Xe) target is used as the target material, the target material supply unit 3 includes a compressed gas cylinder for supplying a high-purity xenon gas, a mass flow controller, a cooling unit for liquefying the xenon gas, the target injection nozzle, and so on. Further, when droplets are generated, a vibrating unit such as a piezoelectric element is added to those component elements.

The EUV light generation chamber 4 is a vacuum chamber in which EUV light is generated. In the EUV light generation chamber 4, a window 11 for passing the pulse laser beam 6 generated by the driver laser system 1 into the EUV light generation chamber 4 is provided. Further, an EUV collector mirror 13 is provided within the EUV light generation chamber 4.

The EUV collector mirror 13 collects EUV light toward the front in FIG. 1. The EUV collector mirror 13 is a concave mirror on the surface of which an Mo/Si film for reflecting light having a wavelength of 13.5 nm, for example, with high reflectance is formed, and the EUV collector mirror 13 reflects and collects the generated EUV light 8 to guide it to a transmission optics. Further, the EUV light is guided to an exposure unit or the like via the transmission optics.

Next, the driver laser system according to the first embodiment of the present invention will be explained.

Figure 2:
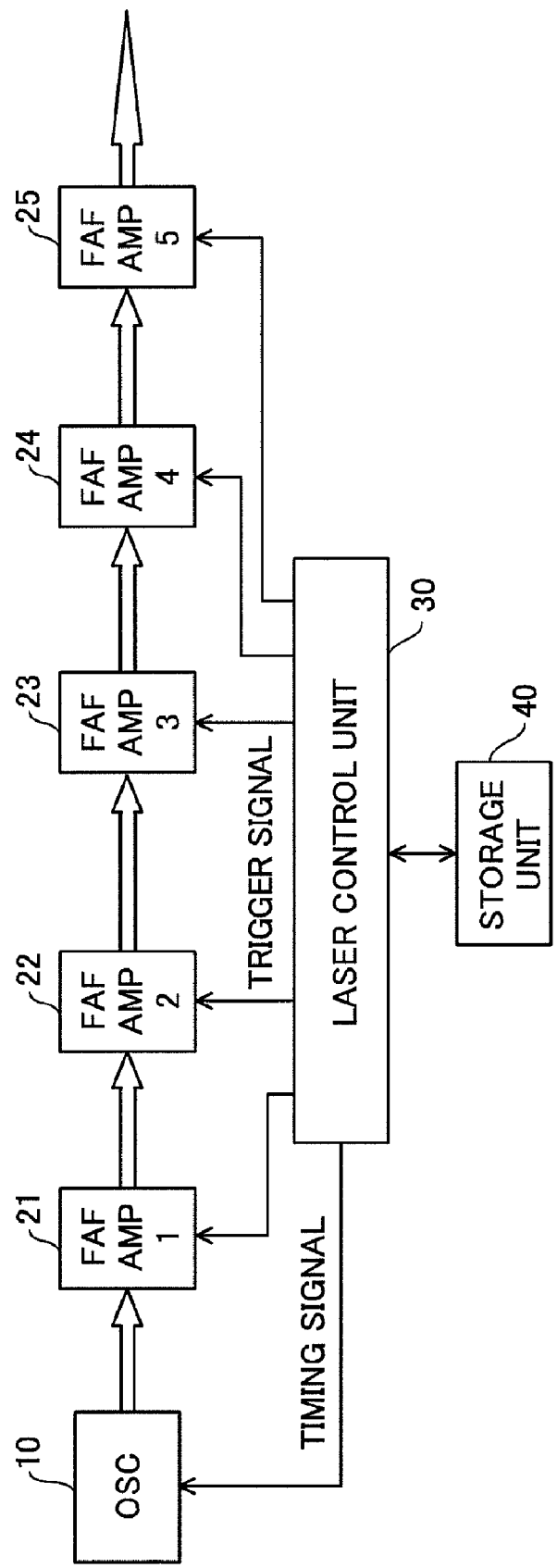
FIG. 2 is a schematic diagram showing an overview of a driver laser system according to the first embodiment of the present invention.

FIG. 2 is a schematic diagram showing an overview of the driver laser system according to the first embodiment of the present invention. In the embodiment, a high-power driver laser system is realized by using a low-power laser as a laser oscillator and amplifying the output of the laser oscillator with plural amplifiers.

In FIG. 2, the driver laser system has a laser oscillator (OSC) 10 for generating a pulse laser beam by oscillation, five-stage fast axial flow type amplifiers (FAFAMP) 21-25 arranged in a series, for sequentially inputting the pulse laser beam generated by the laser oscillator 10 and amplifying the pulse laser beam, a laser control unit 30 for controlling the operations of the laser oscillator 10 and the amplifiers 21-25, and a storage unit 40 such as a memory for storing timing information on the operation timing of the laser oscillator 10 and the amplifiers 21-25. Furthermore, according to need, an isolator may be added to an optical path between the laser oscillator and the amplifier, between the plural amplifiers, or between the final-stage amplifier and the focusing point. As an example of the isolator, there is a spatial filter, a saturable absorber using $SF_6$ gas, or a combination of a polarizer and a retarder.

The laser oscillator 10 is a $CO_2$ laser for generating a short-pulse laser beam, for example, and performs burst oscillation according to a timing signal supplied from the laser control unit 30. In the present application, the burst oscillation refers to a performance of repeating (i) an oscillation operation for outputting a pulse laser beam at a certain desired interval and at a desired repetition frequency with a desired number of laser pulses and (ii) a state of outputting no pulse laser beam. For example, in the first period (burst oscillation period), the pulse laser beam having the pulse width of 20 ns, at the repetition frequency of 100 kHz, with the output of about 60 W is generated, in the second period (burst halt period), the generation of the pulse laser beam is halted, and thus, the burst oscillation period and the burst halt period are alternately repeated. The reason that the burst oscillation operation is necessary is as follows. The first period (burst oscillation period) is the time for exposing a resist on a wafer in the exposure unit. On the other hand, the second period (burst halt period) is the time not for exposure in the exposure unit, i.e., the time for moving a stage, the time for replacing a wafer, or the time for replacing a mask.

The amplifiers 21-25 are laser amplifiers for exciting a $CO_2$ laser gas by high-frequency discharge, and amplify the pulse laser beam with predetermined gains by controlling the high-frequency discharge in response to plural trigger signals to be supplied, respectively. Thereby, the pulse laser beam generated by the laser oscillator 10 is sequentially amplified by the amplifiers 21-25, and consequently, the output of about 10 kW to 20 kW is obtained, for example.

In the embodiment, the discharge time of the amplifiers that consume the great power is reduced by restricting the time when the amplification gain exists in at least one of the amplifiers 21-25 (the time for high-frequency discharge). Thereby, the energy efficiency of the entire driver laser system can be improved and the power consumption of the driver laser system as a problem in the LPP type EUV light source apparatus can be reduced.

The laser control unit 30 generates a timing signal for providing the timing of the oscillation operation of the laser oscillator 10 and generates at least one trigger signal for controlling the amplification operation of at least one amplifier based on the timing information stored in the storage unit 40.

For example, the laser control unit 30 receives an operation pattern of the EUV light source apparatus from the exposure unit and stores at least one burst pattern in the storage unit 40. Then, the laser control unit 30 loads the burst pattern stored in the storage unit 40 as needed, and generates the timing signal based thereon and supplies it to the laser oscillator 10. Alternatively, the timing signal for controlling ON/OFF of the burst oscillation operation may be stored in the storage unit 40, and the laser control unit 30 may load the timing signal and supply it to the laser oscillator 10, and thereby, the oscillation and halt of the laser oscillator 10 may be controlled.

Further, the amplification timings and halt timings corresponding to the burst pattern are stored in the storage unit 40, and the laser control unit 30 loads the amplification timings and halt timings stored in the storage unit 40 and generates at least one trigger signal based thereon and supplies it to at least one amplifier.

When a trigger signal is activated, each amplifier starts the amplification operation. The amplification operation is performed by RF (radio frequency) discharge between electrodes facing each other. Further, when the trigger signal is deactivated, the amplifier stops the RF discharge and halts the amplification operation. Alternatively, the amplifier may hold the RF discharge at the low voltage, so that the amplifier shifts to the high-voltage discharge in response to the activation of the trigger signal to start the amplification operation, and holds the RF discharge at the low voltage in response to the deactivation of the trigger signal to halt the amplification operation. In this case, the amplification operation can be started/halted in a shorter time than the time for starting/stopping discharge, and thereby, the power consumption may be reduced.

Alternatively, the laser control unit 30 may generate a timing signal for providing the timing of the oscillation operation of the laser oscillator 10 and generate at least one trigger signal for controlling the amplification operation of at least one amplifier based on the exposure timing signal (master trigger signal) supplied from the exposure unit to the EUV light source control unit. The exposure timing signal may be generated by directly receiving the burst trigger signal requesting the start of the burst oscillation from the exposure unit, or may be a signal according to some data communication system.

The EUV light source control unit that has received the exposure timing signal from the exposure unit calculates synchronization timing between the component elements of the EUV light source apparatus, determines the operation timing of the driver laser system, and supplies timing information to the laser control unit 30. The laser control unit 30 generates a timing signal for providing the timing of the oscillation operation of the laser oscillator 10 based on the timing information, and determines the amplification timing and the halt timing of at least one amplifier in synchronization with the laser application timing, and generates at least one trigger signal for controlling the amplification operation of the at least one amplifier.

Next, the case where the EUV light source apparatus operates based on the exposure timing signal supplied from the exposure unit will be explained.

Figure 3:
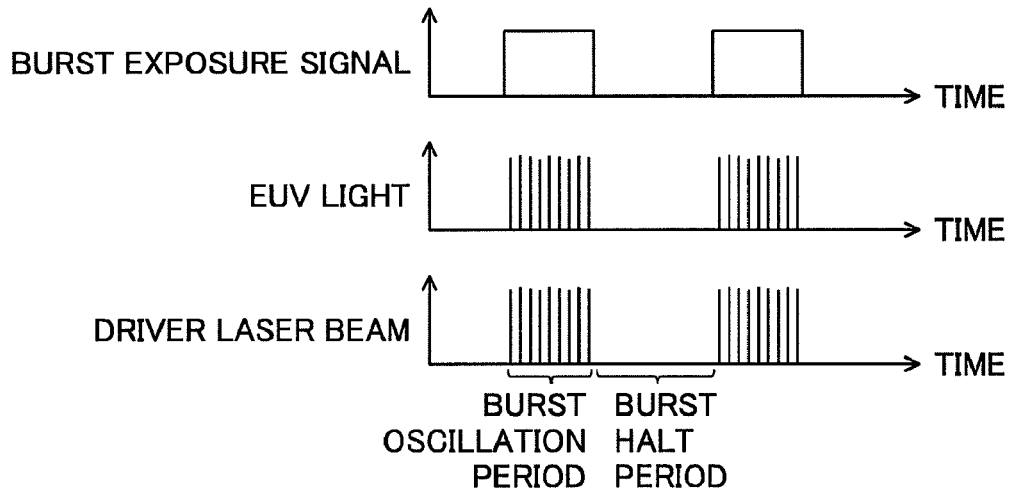
FIG. 3 is a timing chart showing an operation example of the EUV light source apparatus and the driver laser system.

FIG. 3 is a timing chart showing an operation example of the EUV light source apparatus and the driver laser system. In this example, the operation modes of the EUV light source apparatus and the driver laser system are determined according to the burst exposure signal supplied as the exposure timing signal from the exposure unit.

As shown in FIG. 3, in synchronization with the burst exposure signal, the EUV light source apparatus and the driver laser system perform a constantly repeated emission operation in the burst oscillation period, and then, through the burst halt period in several milliseconds to several seconds, again perform a constantly repeated emission operation in the burst oscillation period. Generally, in the driver laser system, the period in which the constantly repeated oscillation operation is performed at certain intervals is called the burst oscillation period, and the period in which the burst oscillation is halted is called the burst halt period or burst interval.

At the actual exposure, the burst oscillation period and the burst halt period are repeated in various times according to the exposure condition. The operation mode is set because, at exposure of a wafer using the exposure unit, exposure of one wafer area is performed under a certain exposure condition, and then, the wafer stage is moved and exposure of another wafer area is performed. When the moving distance to the next exposure area is long, the burst halt period becomes a little longer, and the burst halt period may be several seconds to several tens of seconds when the wafer is replaced or the mask is replaced.

As the signal supplied from the exposure unit to the EUV light source control unit and the signal supplied from the EUV light source control unit to the laser control unit, in place of the burst exposure signal, for example, a signal according to a data communication system may be used, in which the repetition frequency is designated to the first address, the emission time is designated to the second address, the halt time is designated to the third address, and a number of times of the emission is designated to the fourth address.

In the past, in our driver laser system, in order to simplify control of a laser or keep stability of a laser beam, in the burst oscillation period and the burst halt period, the amplifiers continuously perform amplification operations. For example, the operation mode required by the exposure unit is realized by turning on/off of the output of the pulse laser beam from the laser oscillator. This can be realized by a simple configuration, however, energy is consumed by the amplification operations requiring for high power even in the burst halt period when EUV light is unnecessary.

Figure 4:
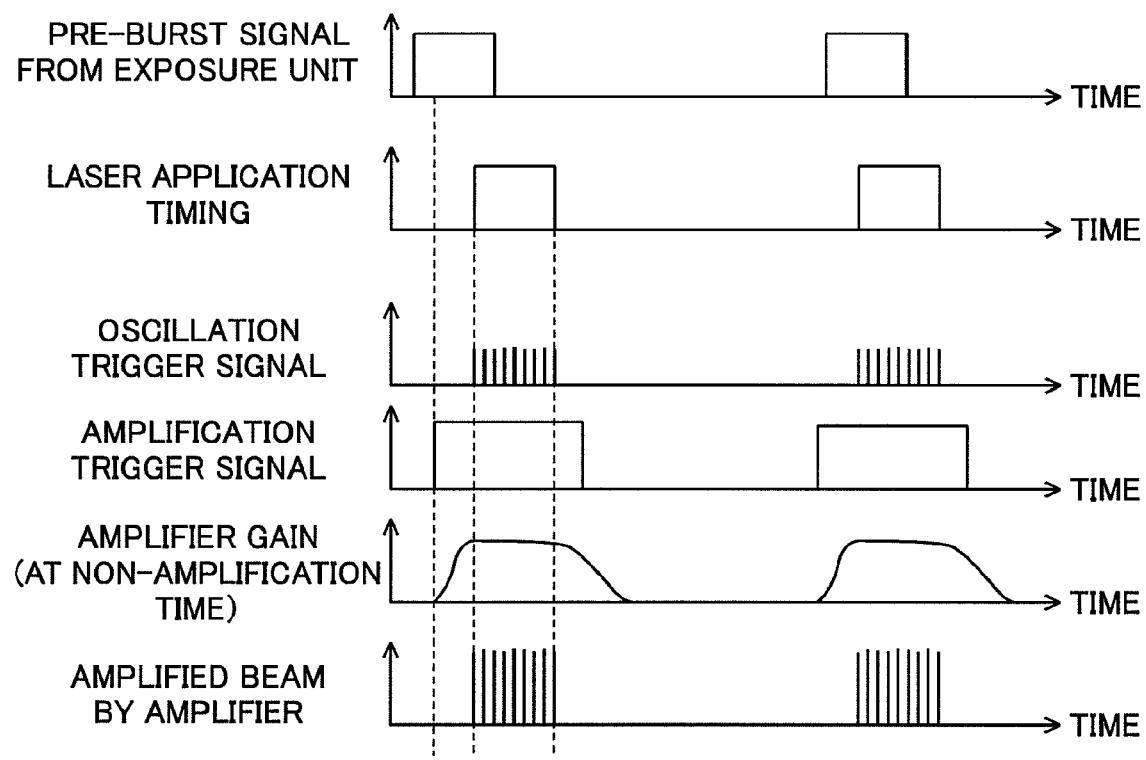
FIG. 4 is a timing chart showing an operation example of the driver laser system shown in FIG. 2.

FIG. 4 is a timing chart showing an operation example of the driver laser system shown in FIG. 2. Here, the operation after a pre-burst signal supplied as an exposure timing signal from the exposure unit is inputted to the driver laser system is shown. Regarding the case where constantly repeated emission of light (e.g., generation of pulse beams having a pulse width of 20 ns at a repetition frequency of 100 kHz) is performed in the burst oscillation period in response to the pre-burst signal and the emission of light is stopped in the burst halt period, the timings of the respective signals, the operation timing of the laser oscillator 10, and the operation timing of one amplifier representing the amplifiers 21-25 will be explained as below.

The EUV control unit that has received the exposure timing signal (pre-burst signal) supplied from the exposure unit generates the laser application timing and the halt timing and supplies the timing information to the laser control unit 30. On the basis of the timing information, the laser control unit 30 generates the oscillation trigger signal in synchronization with the constantly repeated emission timing and supplies it to the laser oscillator 10. The laser oscillator 10 controls the voltage applied to an EO Pockels cell (not shown) in response to the oscillation trigger signal to output a pulse laser beam.

In the amplifier, a certain time is necessary from the start of the high-frequency discharge until the amplification gain is generated to enable the desired amplification. Accordingly, the supply of the amplification trigger signal to the amplifier is performed prior to the supply of the oscillation trigger signal to the laser oscillator 10. A time of about several hundreds of nanoseconds to several microseconds is necessary from the start of the discharge until the amplification gain has desired intensity, and the time varies depending on the discharge condition and the medium gas condition. Accordingly, it is desirable to measure the time in advance and determine how much earlier the amplification trigger signal is supplied than the supply of the oscillation trigger signal. Further, in consideration of the optical path length from the laser oscillator 10 to the amplifier, the time corresponding to the optical path length may be subtracted from the determined value.

At the timing when the amplifier starts the high-frequency discharge in response to the amplification trigger signal and the amplification gain has sufficient intensity, the first pulse laser beam of the burst oscillation outputted from the laser oscillator 10 is arranged to pass through the amplifier. Further, after the last pulse laser beam of the burst oscillation passes through the amplifier, it is desired that the amplification trigger signal is promptly deactivated and the high-frequency discharge of the amplifier is stopped.

The amplification gain exists in a certain time after the discharge is stopped, and in consideration thereof, the amplification trigger signal may be deactivated for stopping the discharge before the laser beam has passed through the amplifier. How much time the amplification gain remains varies depending on the discharge condition and the medium gas condition. Accordingly, it is desirable to measure the time in advance and determine how much earlier the amplification trigger signal is deactivated than the time when the laser beam finishes passing through the amplifier. Further, in consideration of the optical path length within the amplifier, the time corresponding to the optical path length may be added to the determined value.

Figure 5:
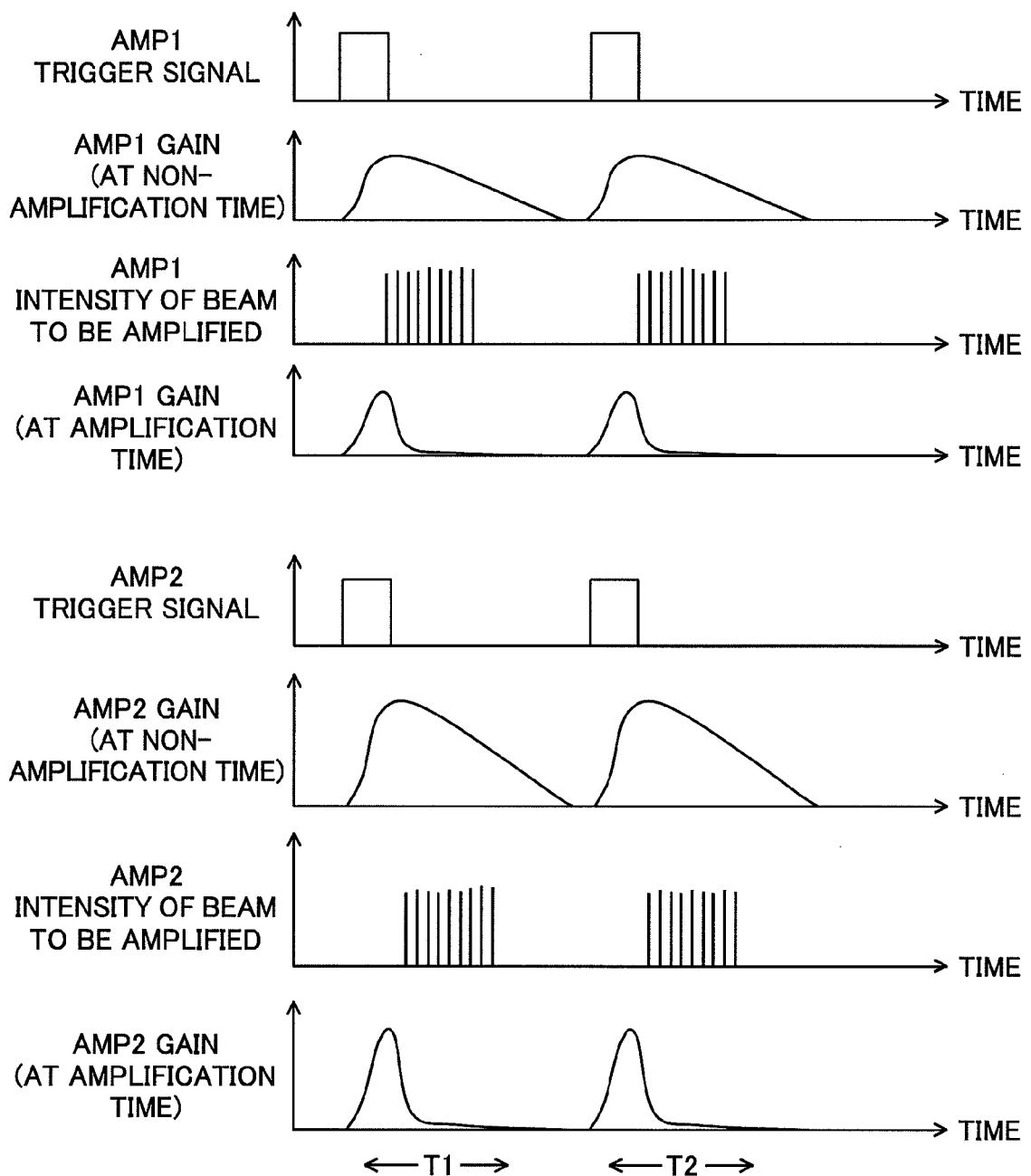
FIG. 5 shows changes in amplification gains over time in the driver laser system shown in FIG. 2.

FIG. 5 shows changes in amplification gains over time in the driver laser system shown in FIG. 2. In FIG. 5, the vertical axes indicate levels of the trigger signals, gains of the amplifiers, or intensity of amplified light, and the horizontal axes indicate time. Here, for easy explanation, two amplifiers AMP 1 and AMP 2 will be explained.

By supplying the AMP 1 with the trigger signal activated in synchronization with the generation of the pulse laser beam in the laser oscillator 10, the gain of the AMP 1 increases to a predetermined value in at least the time (e.g., time T1 and time T2) necessary for amplification of the pulse laser beam (see AMP 1 gain (at non-amplification time) in FIG. 5). When the beam to be amplified is entered into the AMP 1, the beam to be amplified is amplified and the gain of the AMP 1 becomes lower (see AMP 1 gain (at amplification time) in FIG. 5). Here, in the case where the gain of the AMP 1 is allowed to remain lower until the next amplification of the pulse laser beam, the power for keeping the gain of the AMP 1 can be reduced. The same operation is performed on the AMP 2, and thereby, the AMP 1 and AMP 2 can amplify the pulse laser beam in time T1 and time T2.

As a method of adjusting the gain of the amplifier, for example, a high-frequency power supply for applying a high-frequency voltage to a pair of electrodes provided within the chamber of the amplifier may be operated at a very low output and the output of the high-frequency power supply may be raised only in time when the amplification gain is desired to rise. Such an operation can be performed in many $CO_2$ lasers and is called a pulse mode or the like.

FIGS. 6-11 show examples of operation timing of the driver laser system shown in FIG. 2. In the examples shown in FIGS. 6-11, the laser oscillator 10 generates pulse laser beams having the pulse width of 20 ns at the repetition frequency of 100 kHz (repetition time of 10 μs) in the burst oscillation period, and halts the generation of pulse laser beams in the burst halt period (several thousands of microseconds). The time taken from when one pulse laser beam is generated in the laser oscillator 10 to when the pulse laser beam passes through the amplifier 25 is sub-microseconds.

As below, the implications of FIGS. 6-11 will be explained. The characters of OSC, AMP 1, AMP 2, AMP 3, AMP 4, AMP 5 from the top in the vertical direction show that they are provided in series in an optical path. The horizontal axes indicate time, and the numerals of 0, 1, 2, 3, 4, 5 in the horizontal direction schematically show the times when a pulse laser beam passes through the respective AMPs. The blank cells in the horizontal axis indicate the time after one pulse laser beam has passed through the final-stage amplifier until another pulse laser beam is outputted from the OSC again. In these examples, a pulse laser beam having five pulses is generated by burst oscillation in the burst oscillation period. Then, the burst oscillation is stopped in the burst halt period of several thousands of microseconds. Further, the burst oscillation of five pulses in the burst oscillation period is repeated again. Here, the hatched cells from the AMP 1 through the AMP 5 show that the amplifiers have the desired gains. On the other hand, the white cells from the AMP 1 through the AMP 5 show that the high-frequency discharge is stopped and the amplifiers have no gain. However, regarding the OSC (laser oscillator), the hatched cells and the white cells show a state where a pulse laser beam is outputted and a state where no pulse laser beam is outputted, respectively.

In the following working examples, the laser control unit 30 controls the laser oscillator 10 (OSC) to perform burst oscillation and halts at least one amplifier of the amplifiers 21-25 (AMP 1-AMP 5) in the burst halt period between the burst oscillation periods.

Working Example 1

Figure 6:
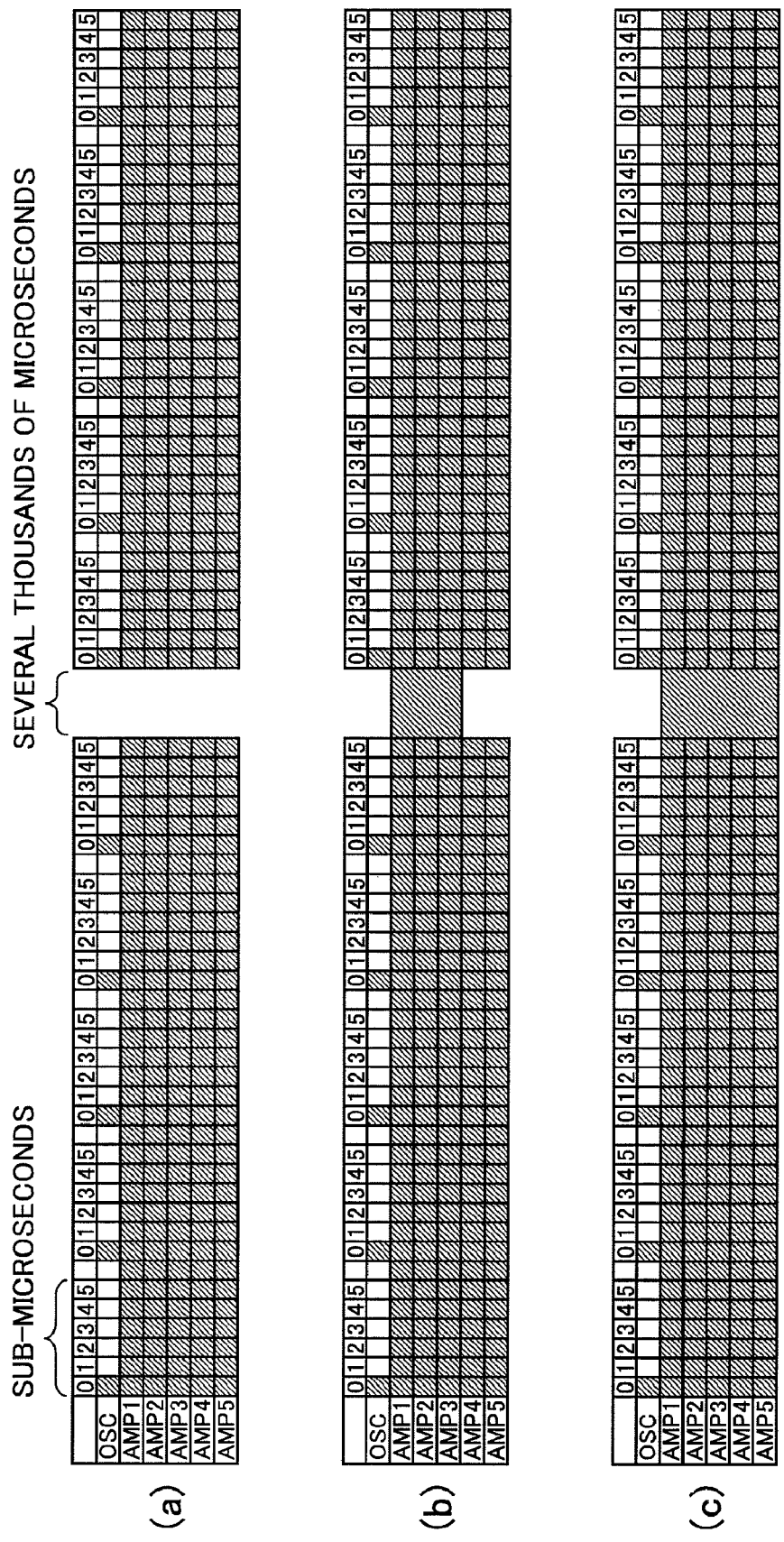

FIG. 6 (a) shows a working example in which the laser control unit 30 simultaneously activates and simultaneously deactivates plural trigger signals for respectively controlling the amplification operations of the AMP 1-AMP 5. The laser control unit 30 determines the timing at which the pulse laser beam is amplified and the timing at which the amplification is halted with respect to all of the amplifiers AMP 1-AMP 5 based on the timing when the burst oscillation is performed by the OSC. Then, the laser control unit 30 simultaneously activates the plural trigger signals for respectively controlling the amplification operations of the AMP 1-AMP 5 in synchronization with the amplification timing. The amplification timing is the timing immediately before the first pulse laser beam of burst oscillation is outputted from the laser oscillator (OSC), passes through the AMP 1, and is amplified. Thereby, the pulse laser beam can be amplified by the AMP 1-AMP 5. Then, the laser control unit 30 simultaneously deactivates the plural trigger signals for respectively controlling the amplification operations of the AMP 1-AMP 5 in synchronization with the halt timing. The halt timing is the timing immediately after the last pulse laser beam of burst oscillation passes through the AMP 5 and is amplified. Thereby, the amplification operations of the AMP 1-AMP 5 can be halted.

Since the burst halt period is extremely long compared to the individual repeated oscillation cycles, the power consumption can be reduced to some extent by halting the amplification operations of the AMP 1-AMP 5 in the burst halt period. According to the working example 1, the power consumption is at the middle level, the suppression effect of self-oscillation is a little, and the suppression effect of return light is a little, however, the control is extremely easy only by simultaneous activation and deactivation of the five trigger signals.

Working Example 2

FIG. 6 (b) shows a working example in which the laser control unit 30 simultaneously activates and simultaneously deactivates plural trigger signals for respectively controlling the amplification operations of a predetermined number of downstream amplifiers of the AMP 1-AMP 5. The laser control unit 30 determines the timing at which the pulse laser beam is amplified and the timing at which the amplification is halted with respect to some downstream amplifiers (here, AMP 4 and AMP 5) based on the timing when the burst oscillation is performed by the OSC. Then, the laser control unit 30 simultaneously activates the plural trigger signals for respectively controlling the amplification operations of the AMP 4 and AMP 5 in synchronization with the amplification timing. The amplification timing is the timing immediately before the first pulse laser beam of burst oscillation is outputted from the laser oscillator (OSC), passes through the AMP 1, and is amplified. Thereby, the pulse laser beam can be amplified by the AMP 1-AMP 5. Then, the laser control unit 30 simultaneously deactivates the plural trigger signals for respectively controlling the amplification operations of the AMP 4 and AMP 5 in synchronization with the halt timing. The halt timing is the timing immediately after the last pulse laser beam of burst oscillation passes through the AMP 5 and is amplified. Thereby, the amplification operations of the AMP 4 and AMP 5 can be halted. According to the working example 2, the suppression effect of self-oscillation is a little and the suppression effect of return light is a little, however, the control is extremely easy only by simultaneous activation and deactivation of the two trigger signals. Here, as the input power is larger in the order of OSC, AMP 1-AMP 5, the power reduction is greater by halting the amplification operations of the AMP 4 and AMP 5 than by halting the amplification operations of the AMP 1 and AMP 2.

Comparative Example

As a comparative example, FIG. 6 (*c*) shows a control method in the case where the amplifiers AMP 1-AMP 5 are constantly in the activated state, which is a problem to be solved in the present invention. In the comparative example, the AMP 1-AMP 5 perform amplification operations even in the burst halt period, and thereby, the power consumption becomes greater.

By the way, in the case where there is a time when excessive gains simultaneously exist in all amplifiers, self-oscillation is caused, that is, all amplifiers are optically coupled and a continuous oscillation phenomenon occurs. The energy of the amplifiers is consumed due to the continuous oscillation, and thus, the amplifiers become unable to perform amplification operations. Conventionally, in order to prevent the phenomenon, isolators are inserted every plural amplifiers for preventing self-oscillation.

Further, if return light is generated from the target, the return light returns while being amplified in the amplification optical path in which gains exist and the amplified return light breaks the laser oscillator. For example, in the case where a laser beam of 20 kW is applied to a target and return light of 50 W is generated, the return light of about 1 kW to 3 kW returns to the laser oscillator. However, the laser oscillator is designed for output of about 60 W, and, when the return light of about 1 kW to 3 kW enters the oscillator, optical elements therein are broken. Also in order to prevent this, isolators are necessary, and since the return light having lower intensity than the amplified light is absorbed by the isolators to be weakened, the breakage of the laser oscillator is prevented.

As described above, in the driver laser system for EUV light source which system has a long amplification optical path and applies a laser beam to a target, isolators are essential. The laser isolator absorbs 90% or more of the light emitted due to the excessive gain and inducing self-oscillation, and also absorbs about 10% of the amplified light. Further, the same is true with the return light. For example, in the case of using a saturable absorber as an isolator, energy loss of about 10% to 20% is caused for the transmitted light depending on the configuration.

Thereby, the laser beam is attenuated by the isolators while amplified by the amplifiers. Accordingly, in the case where a high-power laser beam is desired, a high-power amplifier is necessary for making up for attenuation, or the number of amplifiers should be increased, and therefore, the power and foot print therefor is necessary. Further, since the isolator converts the absorbed laser energy into heat of a gas, and a gas circulation unit and a chiller for radiation of the heat are necessary, which causes further increase in the power and footprint.

On this account, in FIGS. 7-11, the laser control unit 30 controls the laser oscillator 10 (OSC) to perform repeated oscillation and halts at least one of the amplifiers 21-25 (AMP1-AMP 5) in the oscillation halt period between the repeated oscillation periods.

Working Example 3

Figure 7:
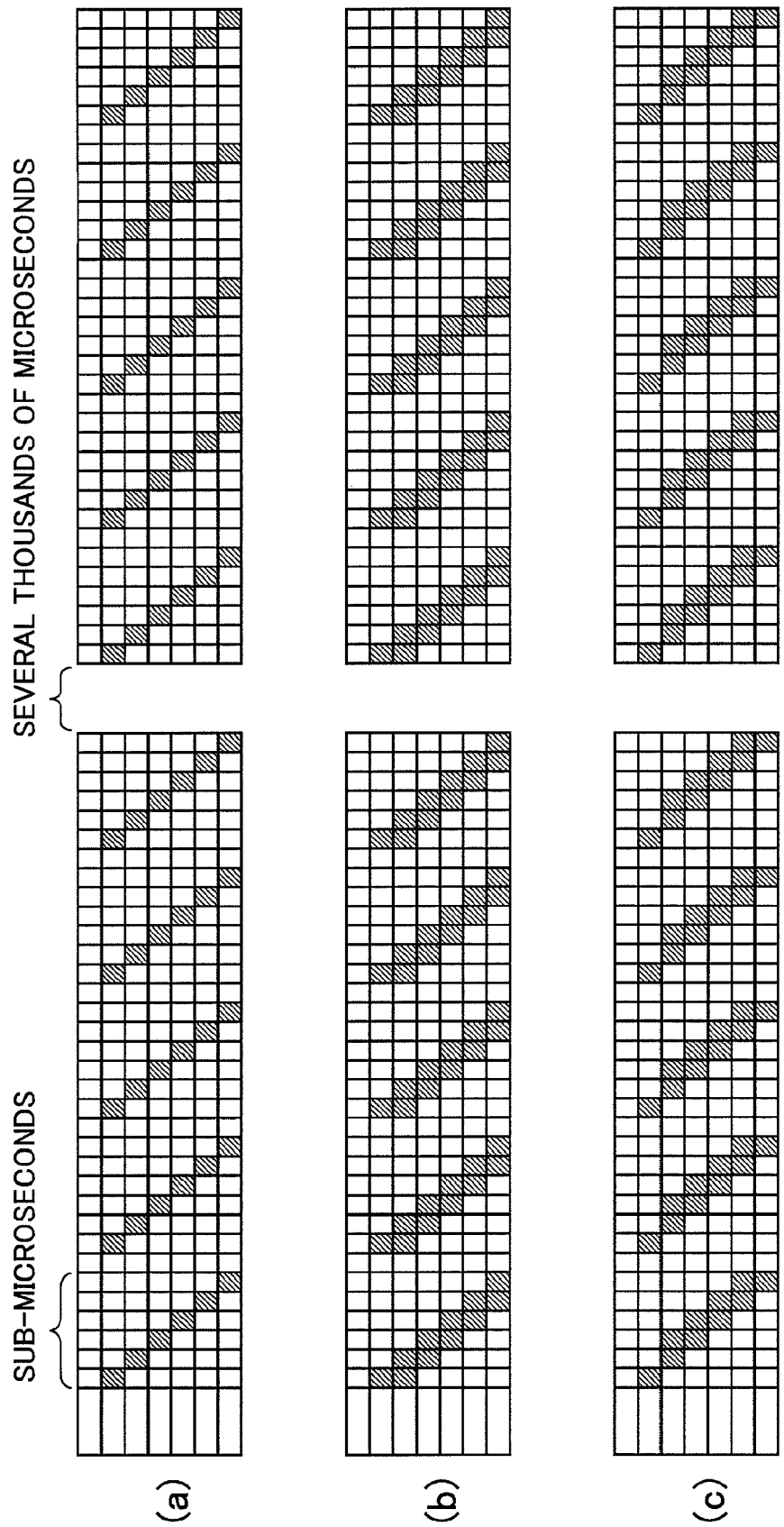

FIG. 7 (*a*) shows the most ideal working example in which only one of the AMP 1-AMP 5 is selectively operated concurrently with the passing of a pulse laser beam with respect to each pulse. The laser control unit 30 determines the timing at which the pulse laser beam is amplified and the timing at which the amplification is halted with respect to all of the amplifiers AMP 1-AMP 5 based on the timing when the pulse laser beam is generated by the OSC. Then, the laser control unit 30 sequentially activates the plural trigger signals for respectively controlling the amplification operations of the AMP 1-AMP 5 in synchronization with the amplification timings. The amplification timings are the timings immediately before the pulse laser beam passes through the respective amplifiers. Thereby, the pulse laser beam generated by the laser oscillator 10 can be sequentially amplified by the AMP 1-AMP 5. Then, the laser control unit 30 sequentially deactivates the plural trigger signals for respectively controlling the amplification operations of the AMP 1-AMP 5 in synchronization with the halt timings. The halt timings are the timings immediately after the pulse laser beam passes through the respective amplifiers and is amplified. Thereby, the amplification operations of the AMP 1-AMP 5 can be halted. According to the working example 3, the power consumption is at the minimum, the suppression effect of self-oscillation is at the maximum, and the suppression effect of return light is at the maximum.

Working Example 4

FIG. 7 (*b*) shows a working example in which amplifiers are turned on (in states where the amplifiers have desired gains) prior to passing of a pulse laser beam and turned off (in states where the amplifiers have no gain) after passing of the pulse laser beam with respect to each pulse, and it is considered that the amplifiers maintain the sufficiently stable amplification gains and become thermally stable before the pulse laser beam is inputted to the amplifiers. In the following description, "on" and "off" of the amplifiers is according to the above definition. According to the working example 4, the power consumption is low, the suppression effect of self-oscillation is great, and the suppression effect of return light is great. Further, slightly more thermally stable operation can be performed compared to the working example 3.

Working Example 5

FIG. 7 (*c*) shows a working example in which amplifiers are turned on concurrently with passing of a laser beam and turned off after a predetermined time has passed after the passing of the laser beam with respect to each pulse, and the case where the pulse width is long is considered. That is, in the case where the pulse width is long, the pulse laser beam may simultaneously pass through adjacent two amplifiers and be amplified. Accordingly, by simultaneously generating the gains in the adjacent two amplifiers, efficient amplification can be performed. According to the working example 5, the power consumption is low, the suppression effect of self-oscillation is great, and the suppression effect of return light is great.

In the above-mentioned working example 4 and working example 5, the laser control unit 30 activates one of the plural trigger signals, and keeps the trigger signal activated while the laser control unit 30 also activates another trigger signal for the adjacent amplifier. For example, in the case where the pulse width of the pulse laser beam is long and the pulse laser beam simultaneously passes through the adjacent three amplifiers, the trigger signals for the three amplifiers are activated, and thereby, the amplification efficiency can be improved.

Working Example 6

Figure 8:
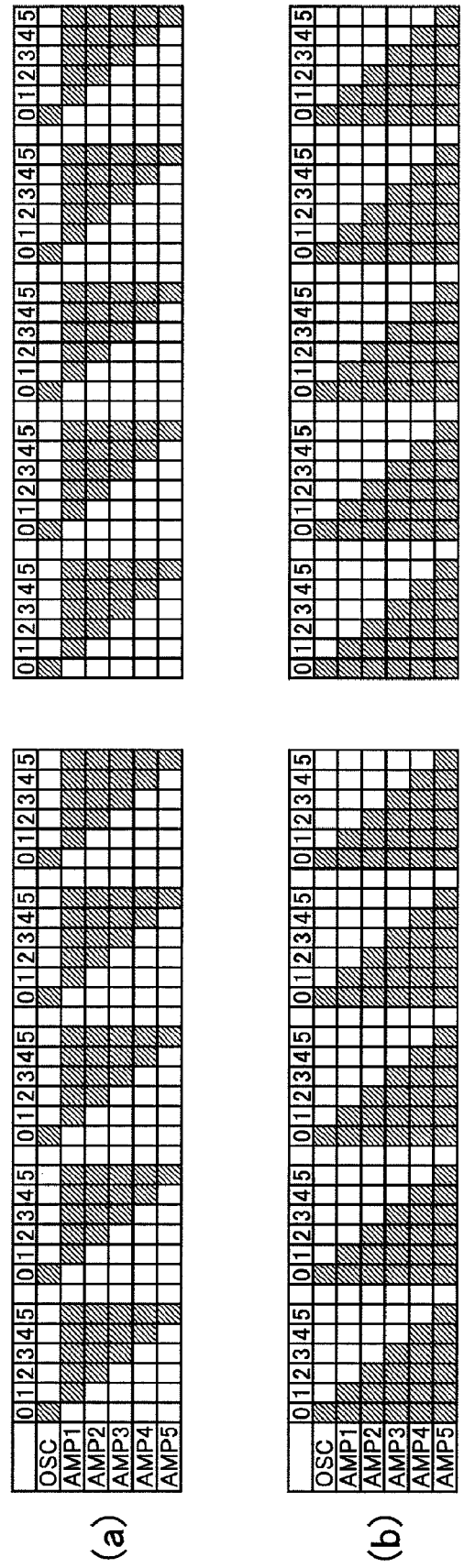

FIG. 8 (*a*) shows a working example in which the respective amplifiers are turned on concurrently with passing of a laser beam and all amplifiers are turned off after the laser beam passes through all amplifiers with respect to each pulse. The laser control unit 30 determines the timing at which the pulse laser beam is amplified and the timing at which the amplification is halted with respect to all of the amplifiers AMP 1-AMP 5 based on the timing when the pulse laser beam is generated by the OSC. Then, the laser control unit 30 sequentially activates the plural trigger signals for respectively controlling the amplification operations of the AMP 1-AMP 5 in synchronization with the amplification timings. The amplification timings are the timings immediately before the pulse laser beam passes through the respective amplifiers. Thereby, the pulse laser beam can be sequentially amplified by the AMP 1-AMP 5. Then, the laser control unit 30 simultaneously deactivates the plural trigger signals for respectively controlling the amplification operations of the AMP 1-AMP 5 in synchronization with the halt timing. The halt timing is the timing immediately after the pulse laser beam passes through the final-stage amplifier (AMP 5) and is amplified. Thereby, the amplification operations of the AMP 1-AMP 5 can be halted. According to the working example 6, the power consumption is low, the suppression effect of self-oscillation is at the middle level, and the suppression effect of return light is a little, and the control is easier than the working example 3 to the working example 5.

Working Example 7

FIG. 8 (*b*) shows a working example in which all amplifiers are turned on and the amplifiers are turned off after a laser beam passes through the respective amplifiers with respect to each pulse. The laser control unit 30 determines the timing at which the pulse laser beam is amplified and the timing at which the amplification is halted with respect to all of the amplifiers AMP 1-AMP 5 based on the timing when the pulse laser beam is generated by the OSC. Then, the laser control unit 30 simultaneously activates the plural trigger signals for respectively controlling the amplification operations of the AMP 1-AMP 5 in synchronization with the amplification timing. The amplification timing is the timing immediately before the pulse laser beam outputted from the laser oscillator (OSC) passes through the AMP 1. Thereby, the pulse laser beam can be amplified by the AMP 1-AMP 5. Then, the laser control unit 30 sequentially deactivates the plural trigger signals for respectively controlling the amplification operations of the AMP 1-AMP 5 in synchronization with the halt timings. The halt timings are the timings immediately after the pulse laser beam passes through the respective amplifiers and is amplified. Thereby, the laser control unit 30 can halt the amplification operations of the AMP 1-AMP 5. According to the working example 7, the power consumption is low and the suppression effect of self-oscillation is a little, but the suppression effect of return light is at a middle level, and the control is easier than the working examples 3-5.

Working Example 8

FIG. 9 (*a*) shows a working example in which upstream amplifiers (AMP 1-AMP 3) are turned on/off and downstream amplifiers (AMP 4 and AMP 5) are sequentially on/off concurrently with passing of a laser beam with respect to each pulse. That is, the laser control unit 30 turns on the upstream amplifiers (AMP 1-AMP 3) simultaneously with the output of the pulse laser beam from the laser oscillator (OSC) and turns off the upstream amplifiers (AMP 1-AMP 3) immediately after the pulse laser beam passes through the AMP 5 and is amplified. The downstream amplifiers AMP 4 and AMP 5 are sequentially turned on while the pulse laser beam passes and is amplified and sequentially turned off immediately after the pulse laser beam passes and is amplified. According to the working example 8, the power consumption is low, the suppression effect of self-oscillation is at a middle level, and the suppression effect of return light is a little, and the ease of the control is at a middle level.

Working Example 9

Working example 9 shown in FIG. 9 (*b*) is the same as working example 8 in the control of turning on/off the upstream amplifiers (AMP 1-AMP 3) and turning on the downstream amplifiers (AMP 4 and AMP 5), however, different in the control of turning off the downstream amplifiers (AMP 4 and AMP 5). The control of turning off the downstream amplifiers is to simultaneously turn off the AMP 4 and AMP 5 immediately after the pulse laser beam passes through the AMP 5. According to the working example 9, the power consumption is low, the suppression effect of self-oscillation is at a middle level, and the suppression effect of return light is a little, and the ease of the control is at a middle level.

Working Example 10

Working example 10 shown in FIG. 9 (*c*) is the same as working example 9 in the control of turning on/off the upstream amplifiers (AMP 1-AMP 3) and turning off the downstream amplifiers (AMP 4 and AMP 5), however, different in the control of turning on the downstream amplifiers (AMP 4 and AMP 5). The control of turning on the downstream amplifiers is to simultaneously turn on the AMP 4 and AMP 5 with the timing immediately before the pulse laser beam passes through the AMP 4 and is amplified. According to the working example 10, the power consumption is low, the suppression effect of self-oscillation is at a middle level, and the suppression effect of return light is a little, and the ease of the control is at a middle level.

Working Example 11

FIG. 9 (*d*) shows a working example in which all amplifiers (AMP 1-AMP 5) are turned on/off at once with respect to each pulse. The laser control unit 30 determines the timing at which a pulse laser beam is amplified and the timing at which the amplification is halted with respect to all of the amplifiers AMP 1-AMP 5 based on the timing when the pulse laser beam is generated by the OSC. Then, the laser control unit 30 simultaneously activates the plural trigger signals for respectively controlling the amplification operations of the AMP 1-AMP 5 in synchronization with the following amplification timing. The amplification timing is the timing immediately before the pulse laser beam from the laser oscillator (OSC) passes through the AMP 1. By simultaneously activating the AMP 1-AMP 5 in this manner, the pulse laser beam can be amplified by the AMP 1-AMP 5. Then, the laser control unit 30 simultaneously deactivates the plural trigger signals for respectively controlling the amplification operations of the AMP 1-AMP 5 in synchronization with the following halt timing. The halt timing is immediately after the pulse laser beam passes through the AMP 5 and is amplified. By simultaneously deactivating the AMP 1-AMP 5 in this manner, the amplification operations of the AMP 1-AMP 5 can be halted. According to the working example 11, the power consumption is low, the suppression effect of self-oscillation is a little, and the suppression effect of return light is a little, and the control becomes easy.

Working Example 12

Figure 10:
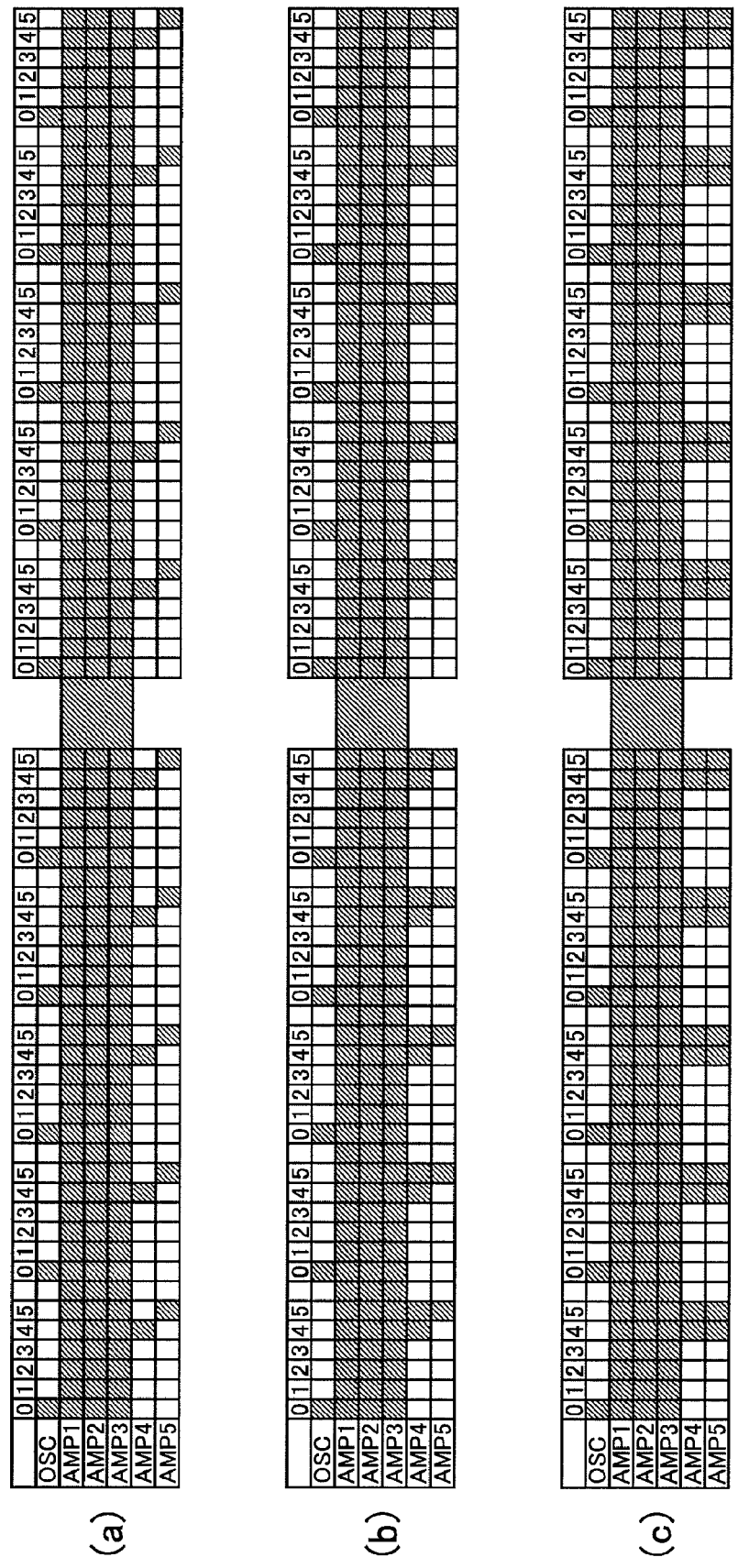

FIG. 10 (*a*) shows a working example in which upstream amplifiers (AMP 1-AMP 3) are constantly on and downstream amplifiers (AMP 4 and AMP 5) are sequentially turned on/off concurrently with passing of a pulse laser beam with respect to each pulse. The laser control unit 30 determines the amplification timings and the halt timings with respect to AMP 4 and AMP 5 based on the timing when the pulse laser beam is generated by the OSC. Then, the laser control unit 30 sequentially activates trigger signals for respectively controlling the amplification operations of the AMP 4 and AMP 5 in synchronization with the amplification timings. The amplification timings are the timings immediately before the pulse laser beam passes through the respective amplifiers. Thereby, the pulse laser beam can be amplified by the AMP 1-AMP 5. Then, the laser control unit 30 sequentially deactivates the trigger signals for respectively controlling the amplification operations of the AMP 4 and AMP 5 in synchronization with the halt timings. The halt timings are the timings immediately after the pulse laser beam passes through the respective amplifiers and is amplified. Thereby, the amplification operations of the AMP 4 and AMP 5 can be halted. According to the working example 12, the power consumption is at a middle level, the suppression effect of self-oscillation is at a middle level, and the suppression effect of return light is a little, and the ease of the control is at a middle level.

Working Example 13

FIG. 10 (*b*) shows a working example in which upstream amplifiers (AMP 1 to AMP 3) are constantly turned on, and downstream amplifiers (AMP 4 and AMP 5) are individually turned on concurrently with passing of a laser beam and turned off after the laser beam passes through all amplifiers with respect to each pulse. The laser control unit 30 determines the amplification timings and the halt timing with respect to AMP 4 and AMP 5 based on the timing when the pulse laser beam is generated by the OSC. Then, the laser control unit 30 sequentially activates trigger signals for respectively controlling the amplification operations of the AMP 4 and AMP 5 in synchronization with the amplification timings. The amplification timings are the timings immediately before the pulse laser beam passes through the respective amplifiers. Thereby, the pulse laser beam can be amplified by the AMP 1-AMP 5. Then, the laser control unit 30 simultaneously deactivates the trigger signals for respectively controlling the amplification operations of the AMP 4 and AMP 5 in synchronization with the halt timing. The halt timing is the timing immediately after the pulse laser beam passes through the AMP 5 and is amplified. Thereby, the amplification operations of the AMP 4 and AMP 5 can be halted. Therefore, the laser control unit 30 also activates the trigger signal for controlling the amplification operation of the AMP 5 while activating the trigger signal for controlling the amplification operation of the AMP 4. Working example 13 is effective in the case where the laser pulse is so long to be simultaneously amplified by AMP 4 and AMP 5, for example. According to the working example 13, the power consumption is at a middle level, the suppression effect of self-oscillation is at a middle level, and the suppression effect of return light is a little, and the ease of the control is at a middle level. In working example 13, the laser control unit 30 may simultaneously activate and sequentially deactivate the plural trigger signals for respectively controlling the amplification operations of the AMP 4 and AMP 5 based on the timing when the pulse laser beam is generated by the OSC.

Working Example 14

FIG. 10 (*c*) shows a working example in which upstream amplifiers (AMP 1 to AMP 3) are constantly turned on, and downstream amplifiers (AMP 4 and AMP 5) are turned on at once concurrently with passing of a laser beam and turned off after the laser beam passes through all amplifiers with respect to each pulse. The laser control unit 30 determines the amplification timing and the halt timing with respect to AMP 4 and AMP 5 based on the timing when the pulse laser beam is generated by the OSC. Then, the laser control unit 30 simultaneously activates trigger signals for respectively controlling the amplification operations of the AMP 4 and AMP 5 in synchronization with the amplification timing. The amplification timing is the timing immediately before the pulse laser beam passes through the AMP 4 and is amplified. Thereby, the pulse laser beam can be sequentially amplified by the AMP 1-AMP 5. Then, the laser control unit 30 simultaneously deactivates the trigger signals for respectively controlling the amplification operations of the AMP 4 and AMP 5 in synchronization with the halt timing. The halt timing is the timing immediately after the pulse laser beam passes through the AMP 5 and is amplified. Thereby, the amplification operations of the AMP 4 and AMP 5 can be halted. According to the working example 14, the power consumption is at a middle level, the suppression effect of self-oscillation is at a middle level, and the suppression effect of return light is a little, and the ease of the control is at a middle level.

Working Example 15

Figure 11:
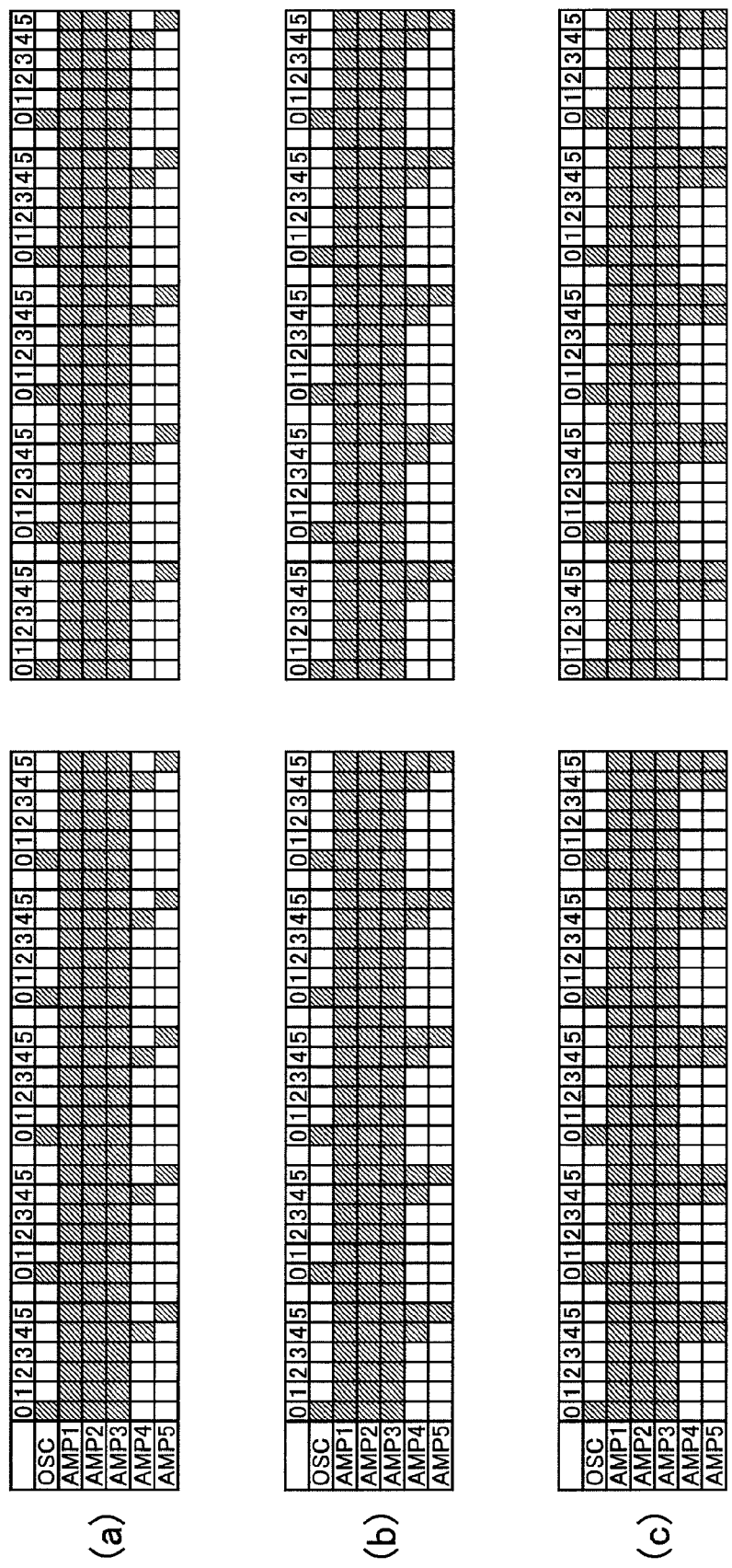

FIG. 11 (*a*) shows a working example in which upstream amplifiers (AMP 1-AMP 3) are turned on/off with respect to each burst and downstream amplifiers (AMP 4 and AMP 5) are sequentially on/off concurrently with passing of a laser beam with respect to each pulse. The laser control unit 30 determines the amplification timing and the halt timing with respect to AMP 1-AMP 3 based on the timing when burst oscillation is performed by the OSC. Then, the laser control unit 30 simultaneously activates trigger signals for respectively controlling the amplification operations of the AMP 1 to AMP 3 in synchronization with the amplification timing. The amplification timing is the timing when the first pulse of each burst oscillation is outputted from the OSC. Thereby, the pulse laser beam can be amplified by the AMP 1-AMP 3. Then, the laser control unit 30 simultaneously deactivates the trigger signals for respectively controlling the amplification operations of the AMP 1-AMP 3 in synchronization with the halt timing. The halt timing is the timing immediately after the last pulse of each burst oscillation passes through the AMP 5 and is amplified. Thereby, the amplification operations of the AMP 1 to AMP 3 can be halted.

Further, the laser control unit 30 determines the amplification timings and the halt timings with respect to AMP 4 and AMP 5 based on the timing when the pulse laser beam is generated by the OSC. Then, the laser control unit 30 sequentially activates trigger signals for respectively controlling the amplification operations of the AMP 4 and AMP 5 in synchronization with the amplification timings. The amplification timings are the timings immediately before the pulse laser beam respectively passes through the AMP 4 and AMP 5 and is amplified. Thereby, the pulse laser beam can be amplified by the AMP 4 and AMP 5. Then, the laser control unit 30 sequentially deactivates the trigger signals for respectively controlling the amplification operations of the AMP 4 and AMP 5 in synchronization with the halt timings. The halt timings are the respective timings immediately after the pulse laser beam respectively passes through the AMP 4 and AMP 5 and is amplified. Thereby, the laser control unit 30 halts the amplification operations of the AMP 4 and AMP 5. According to the working example 15, the power consumption is at a middle level, the suppression effect of self-oscillation is at a middle level, and the suppression effect of return light is a little, and the ease of the control is at a middle level.

Working Example 16

FIG. 11 (b) shows a working example in which upstream amplifiers (AMP 1-AMP 3) are turned on/off with respect to each burst, and downstream amplifiers (AMP 4 and AMP 5) are individually turned on concurrently with passing of a laser beam and turned off after the laser beam passes through all amplifiers with respect to each pulse. In the working example, the control of the amplification timing and the halt timing of the upstream amplifiers (AMP 1-AMP 3) and the control of the amplification timings of the downstream amplifiers (AMP 4 and AMP 5) are completely the same as those in working example 15. The point different from working example 15 is the halt timings of the downstream amplifiers (AMP 4 and AMP 5) and that the amplification operations of the AMP 4 and AMP 5 are simultaneously halted at the time immediately after the pulse laser beam passes through the AMP 5 and is amplified. According to the working example 16, the power consumption is at a middle level, the suppression effect of self-oscillation is at a middle level, and the suppression effect of return light is a little, and the ease of the control is at a middle level.

Working Example 17

FIG. 11 (c) shows a working example in which upstream amplifiers (AMP 1-AMP 3) are turned on/off with respect to each burst, and downstream amplifiers (AMP 4 and AMP 5) are turned on at once concurrently with passing of a laser beam and turned off after the laser beam passes through all amplifiers with respect to each pulse. In the working example, the control of the amplification timing and the halt timing of the upstream amplifiers (AMP 1-AMP 3) and the control of the halt timing of the downstream amplifiers (AMP 4 and AMP 5) are completely the same as those in working example 16. The point different from working example 16 is the amplification timing of the downstream amplifiers (AMP 4 and AMP 5) and that the amplification operations of the AMP 4 and AMP 5 are simultaneously activated at the time immediately before the pulse laser beam passes through the AMP 4 and is amplified. According to the working example 17, the power consumption is at a middle level, the suppression effect of self-oscillation is at a middle level, and the suppression effect of return light is a little, and the ease of the control is at a middle level.

As below, the orders of superiority of the respective working examples and comparative example on the respective evaluation items will be described.

(1) The ascending order of power consumption is as follows: working example 3; working example 5; working example 4; working example 8; working example 6; working example 9; working example 10; working example 7; working example 11; working example 15; working example 16; working example 17; working example 12; working example 13; working example 14; working example 1; working example 2; and comparative example.

(2) The descending order of ease of control is as follows: comparative example; working example 2; working example 3; working example 14; working example 13; working example 12; working example 17; working example 16; working example 15; working example 11; working example 10; working example 9; working example 8; working example 7; working example 6; working example 4; working example 5; and working example 3.

(3) The descending order of prevention characteristic of self-oscillation or return light is as follows: working example 3; working example 4; working example 5; working example 7; working example 8; working example 6; working example 9; working example 10; working example 11; working example 15; working example 16; working example 17; working example 12; working example 13; working example 14; working example 1; working example 2; and comparative example.

(4) The descending order of thermal stability of laser is as follows: comparative example; working example 2; working example 1; working example 14; working example 13; working example 12; working example 17; working example 16; working example 15; working example 11; working example 10; working example 9; working example 8; working example 7; working example 6; working example 5; working example 4; and working example 3.

In the above-described first embodiment, the case of using five amplifiers 21-25 has been explained, however, the number of amplifiers is not limited to that but plural amplifiers may be used. For example, in the case of using four amplifiers, the operation of removing the AMP 3 or AMP 5 is performed in FIGS. 6-11.

Next, a driver laser system according to the second embodiment of the present invention will be explained.

Figure 12:
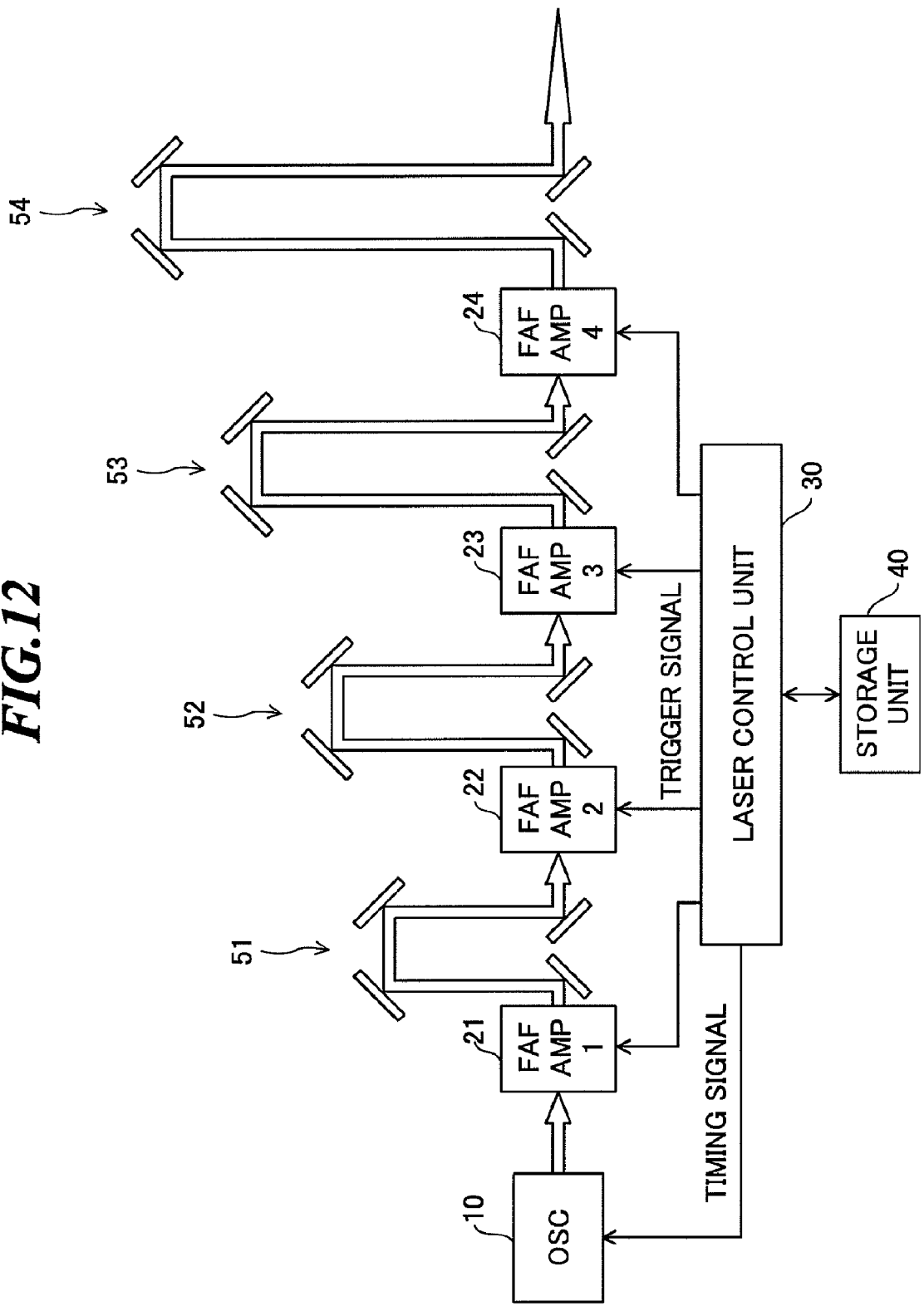
FIG. 12 is a schematic diagram showing an overview of a driver laser system according to the second embodiment of the present invention.

FIG. 12 is a schematic diagram showing an overview of the driver laser system according to the second embodiment of the present invention. As shown in FIG. 12, the driver laser system has a laser oscillator (OSC) 10 for generating a pulse laser beam by oscillation, four fast axial flow type amplifiers (FAFAMP) 21-24 arranged in series for sequentially inputting a pulse laser beam generated by the laser oscillator 10 and amplifying the pulse laser beam, a laser control unit 30 for controlling the operations of the laser oscillator 10 and the amplifiers 21-24, a storage unit 40 such as a memory for storing timing information on the operation timing of the laser oscillator 10 and the amplifiers 21-24, and optics 51-54 provided at the downstream of the amplifiers 21-24, each for delaying the pulse laser beam inputted from respective one of the amplifiers 21-24 and outputting the delayed pulse laser beam.

Each of the optics 51-54 includes four mirrors provided at predetermined angles, for example, and forms an optical delay path. Desirably, the optical delay paths and other optical paths are placed in vacuum or an atmosphere of nitrogen ($N_2$) or the like for preventing attenuation of the pulse laser beam.

Figure 13:
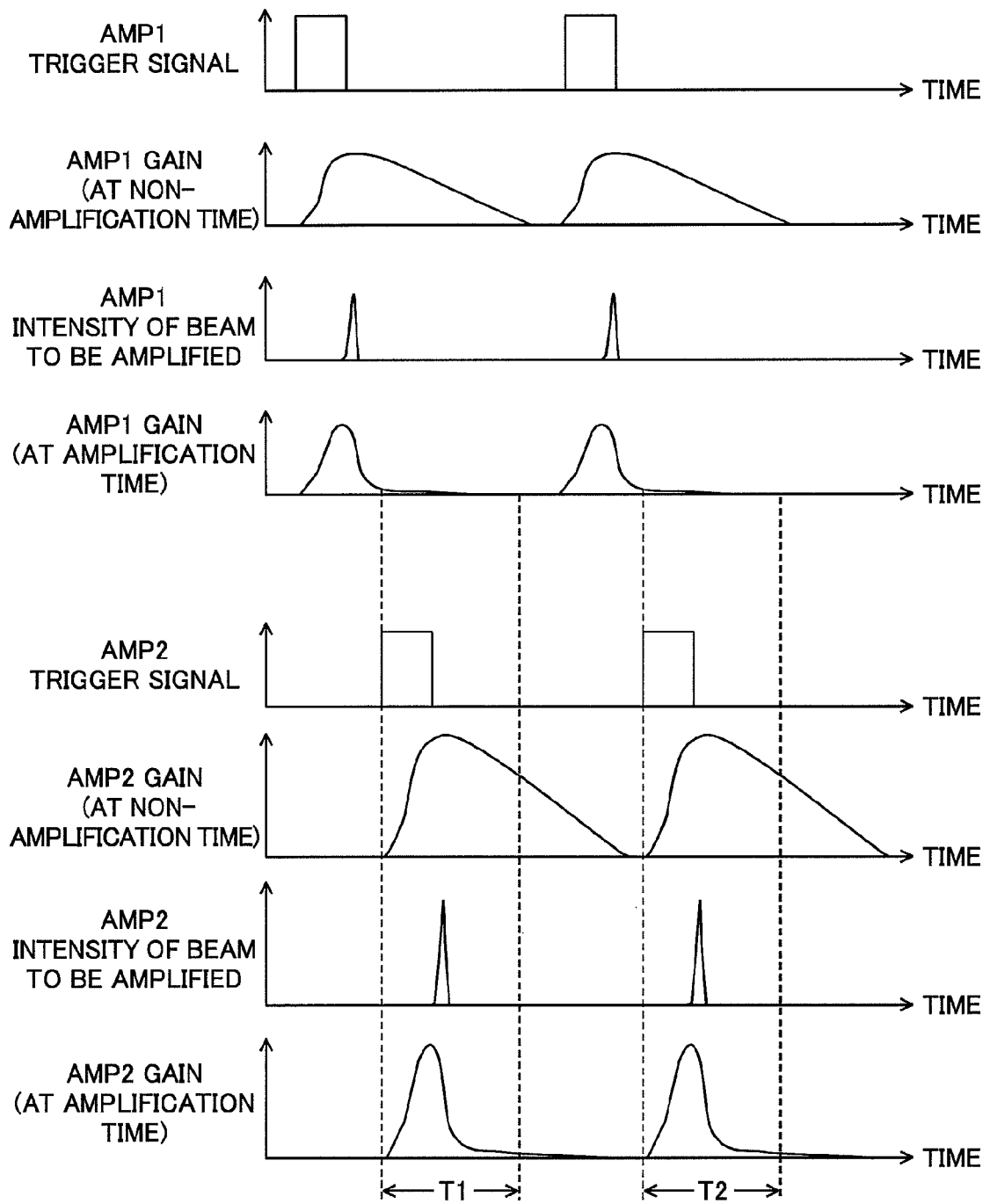
FIG. 13 shows changes in amplification gains over time in the driver laser system according to the second embodiment of the present invention.

FIG. 13 shows changes in amplification gains over time in the driver laser system according to the second embodiment of the present invention. In FIG. 13, the vertical axes indicate levels of trigger signals, gains of the amplifiers, or intensity of beam to be amplified, and the horizontal axes indicate time. Here, for easy explanation, it is assumed that a laser beam is amplified by two amplifiers AMP 1 and AMP 2.

By supplying the trigger signal activated in synchronization with the generation of the pulse laser beam in the laser oscillator to the AMP 1, the gain of the AMP 1 increases to a predetermined value only in the time necessary for amplification of the pulse laser beam (see AMP 1 gain (at non-amplification time) in FIG. 13). When the beam to be amplified is entered into the AMP 1, the beam to be amplified is amplified and the gain of the AMP 1 becomes lower (see AMP 1 gain (at amplification time) in FIG. 13). In the present invention, the gain of the AMP 1 is allowed to remain lower until the next pulse laser beam is amplified. Thereby, the power for maintaining the gain of the AMP 1 can be reduced.

The same operation is performed on the AMP 2, and thereby, the AMP 2 can perform amplification in time T1 and time T2 when the gain of the AMP 1 becomes lower and the gain is nearly lost. In the time T1 and time T2, only the AMP 2 has a gain that has achieved a predetermined level, self-oscillation due to coupling of the amplification operation of the AMP 1 and the amplification operation of the AMP 2 hardly occurs. Therefore, an isolator for preventing self-oscillation is not necessary and the pulse laser beam can keep the energy, which may have been absorbed by the isolator. Accordingly, there is an advantage that relatively low-power amplifiers may be used and the number of amplifiers may be reduced in some cases.

In the conventional driver laser system, the isolator is not only for prevention of self-oscillation but also for protection from return light. In the embodiment, since the gain is very low except at the amplification time, if return light is generated, the return light is not amplified. In addition, the laser medium that has not been excited serves as an absorber for the laser beam. As a result, the return light returns to the laser oscillator while being attenuated, and the intensity can be made harmless when the light reaches the laser oscillator.

Figure 14:
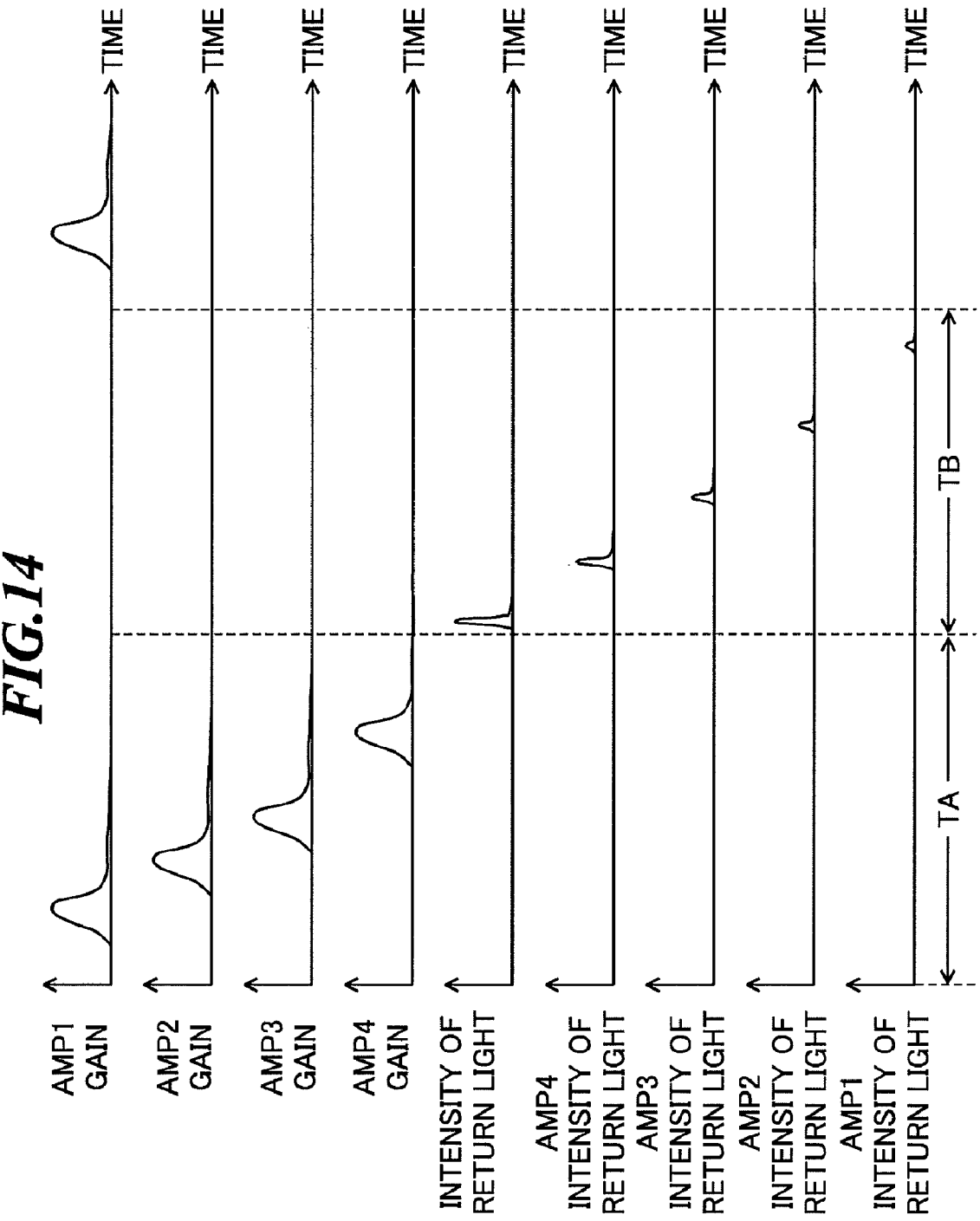
FIG. 14 shows operation timings of plural amplifiers.

FIG. 14 shows operation timings of plural amplifiers. In FIG. 14, the gains of the four amplifiers AMP 1-AMP 4 shown in FIG. 12, intensity of return light returning from the target material to the driver laser system, and intensity of return light returning to the AMP 1-AMP 4 are shown.

In time period TA shown in FIG. 14, the gains of the AMP 1-AMP 4 sequentially increase, however, in time period TB when return light is generated, the gains of the AMP 1-AMP 4 remain lower. Therefore, the return light returns while being attenuated by the laser media of the AMP 1-AMP 4. As described above, no amplification phenomenon occurs while the return light is generated and returns in the optics, the isolator is not necessary in the point. For the purpose, the time period when the amplification gains exist may be restricted so that the amplification operation of the next pulse laser beam is performed after the return light disappears.

To realize the timings as shown in FIGS. 13 and 14, an optical delay path may be provided between the amplifiers as shown in FIG. 12. In this way, the timings at which the pulse laser beams reach the amplifiers may be adjusted such that the gain is nearly lost in one amplifier and then the amplification is performed in the next amplifier. Further, if the optical path becomes very long and the amplification gains of the AMP 1 and AMP 4 simultaneously rise, for example, the AMP 2 and the AMP 3 serve as absorbers and self-oscillation hardly occurs.

Next, the third embodiment of the present invention will be explained.

Figure 15:
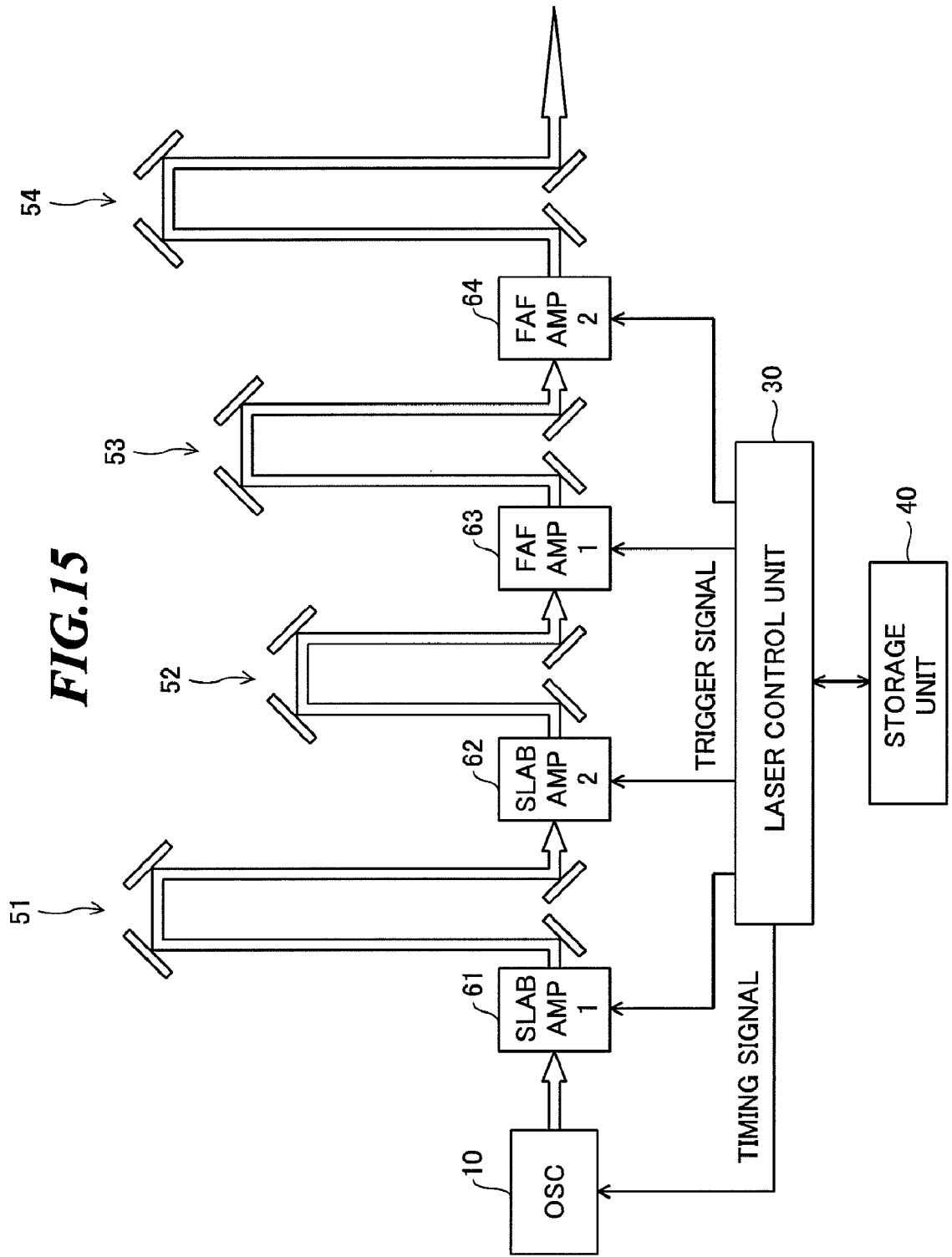
FIG. 15 is a schematic diagram showing an overview of a driver laser system according to the third embodiment of the present invention.

FIG. 15 is a schematic diagram showing an overview of a driver laser system according to the third embodiment of the present invention. In the third embodiment, a high-power driver laser system is realized by using slab type laser amplifiers in the upstream part of the plural amplifiers (at the laser oscillator side). In FIG. 15, slab type laser amplifiers (SLABAMP) 61 and 62 are used for the upstream ones of the plural amplifiers and fast axial flow type amplifiers (FAFAMP) 63 and 64 are used for the downstream ones of the plural amplifiers. In place of at least one fast axial flow type amplifier, at least one triaxial orthogonal type amplifier may be used. Further, since the amplifiers themselves have delay times at some degree, the optics 51-54 may be omitted and the adjacent two amplifiers may be directly coupled.

Figure 16:
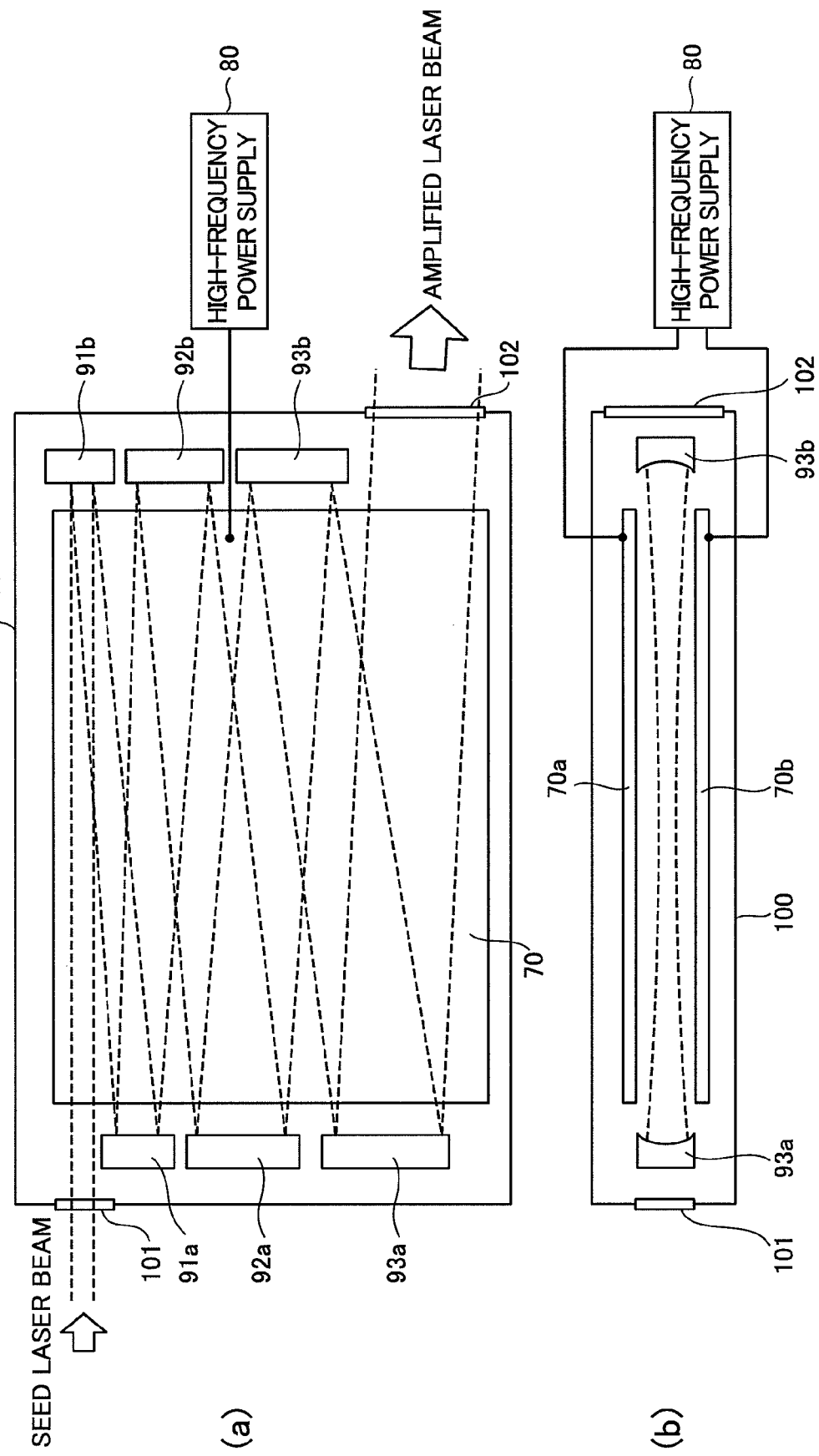
FIG. 16 shows an internal structure of the slab type laser amplifier shown in FIG. 15.

FIG. 16 shows an internal structure of the slab type laser amplifier shown in FIG. 15. FIG. 16 (a) is a plan view, and FIG. 16 (b) is a side view. As shown in FIG. 16, the slab type laser amplifier 61 or 62 includes a chamber 100 having a first window 101 and a second window 102 and filled with a gas containing a laser medium, a pair of large electrodes 70 (70a and 70b) provided facing each other within the chamber 100, for exciting the laser medium in a discharge region formed by application of a high-frequency voltage to amplify a pulse laser beam, a high-frequency power supply 80 for applying the high-frequency voltage to the electrodes 70, and plural mirrors provided within the chamber 100, for multiple-reflecting the pulse laser beam entering from the first window 101 to propagate the pulse laser beam within the discharge region and outputting the pulse laser beam from the second window 102. In FIG. 16, confocal cylindrical mirrors 91a-93a and 91b-93b are used as the plural mirrors. In the embodiment, the example of providing confocal cylindrical mirrors for multipass amplification of the pulse laser beam has been shown, however, the present invention is not limited to the embodiment but multipass amplification may be realized by providing common flat mirrors or spherical mirrors.

By using the slab type laser amplifiers, a long amplification optical path can be provided within one amplifier, and the entire system becomes compact. Further, the cooling efficiency of electrodes is high and the capacity of chiller may be small. Therefore, the number of amplifiers can be reduced and the footprint becomes very small. However, on the other side, since the optical path length is long, there is a disadvantage that the amplifier is easily optically coupled to the downstream amplifier and self-oscillation easily occurs. According to the present invention, the disadvantage can be eliminated. That is, when one slab type laser amplifier is in operation, no amplification gain exists in the other amplifier, and self-oscillation hardly occurs.

Next, the fourth embodiment of the present invention will be explained.

Figure 17:
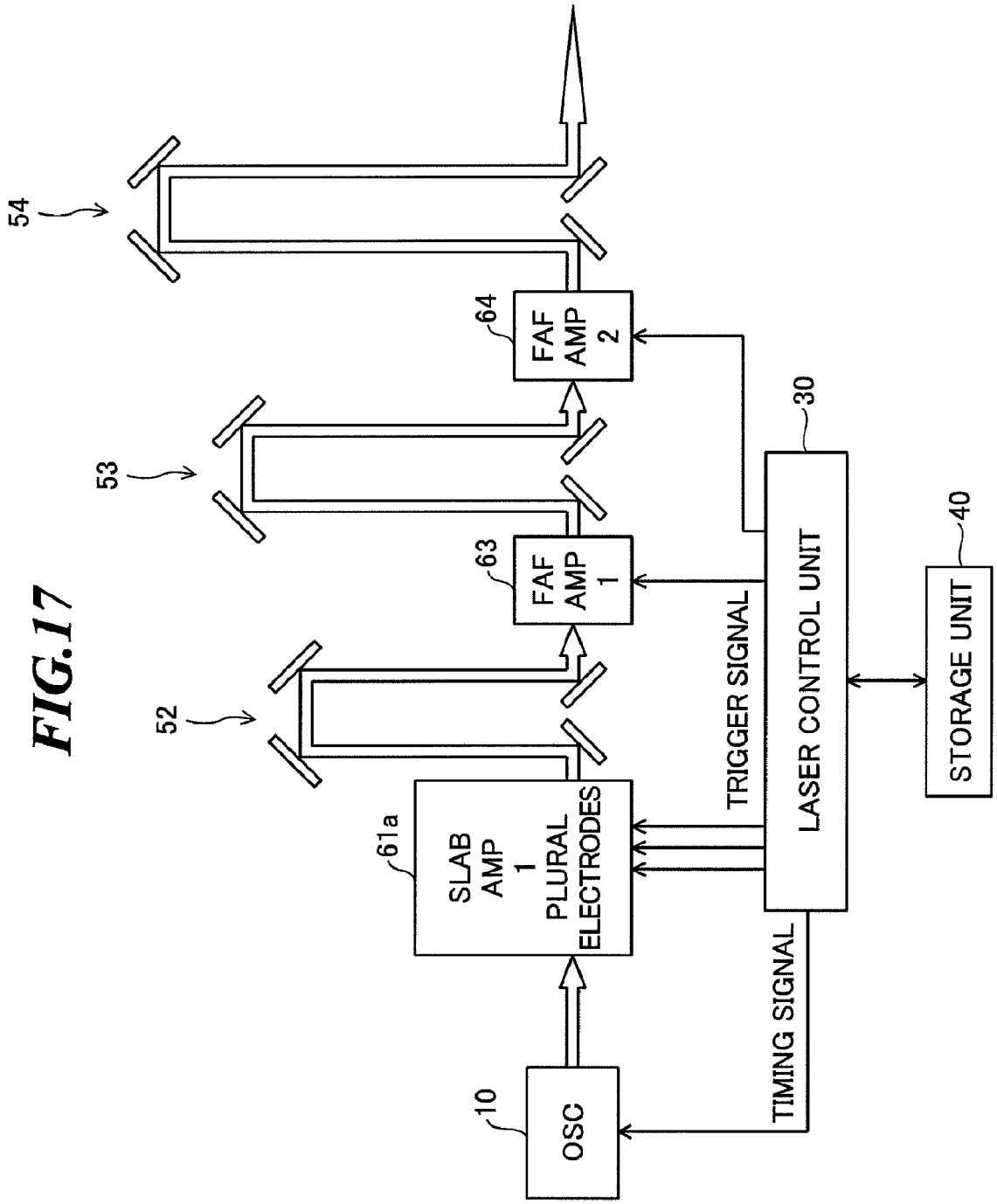
FIG. 17 is a schematic diagram showing an overview of a driver laser system according to the fourth embodiment of the present invention.

FIG. 17 is a schematic diagram showing an overview of a driver laser system according to the fourth embodiment of the present invention. In the fourth embodiment, a slab type laser amplifier is large-scaled and the number of amplifiers is further reduced. In FIG. 17, a large slab type laser amplifier (SLABAMP) 61a is used as the first one of the plural amplifiers and fast axial flow type amplifiers (FAFAMP) 63 and 64 are used for the downstream ones of the plural amplifiers. In place of at least one fast axial flow type amplifier, at least one triaxial orthogonal type amplifier may be used. Further, since the amplifiers themselves have delay times at some degree, the optics 52-54 may be omitted and the adjacent two amplifiers may be directly coupled.

In the large slab type laser amplifier, it is necessary to divide electrodes inside and operate plural pairs of electrodes at different timings. In this case, the operation performed by the plural slab type laser amplifiers 61 and 62 in the third embodiment may be performed by the plural pairs of electrodes within the slab type laser amplifier 61*a*.

Figure 18:
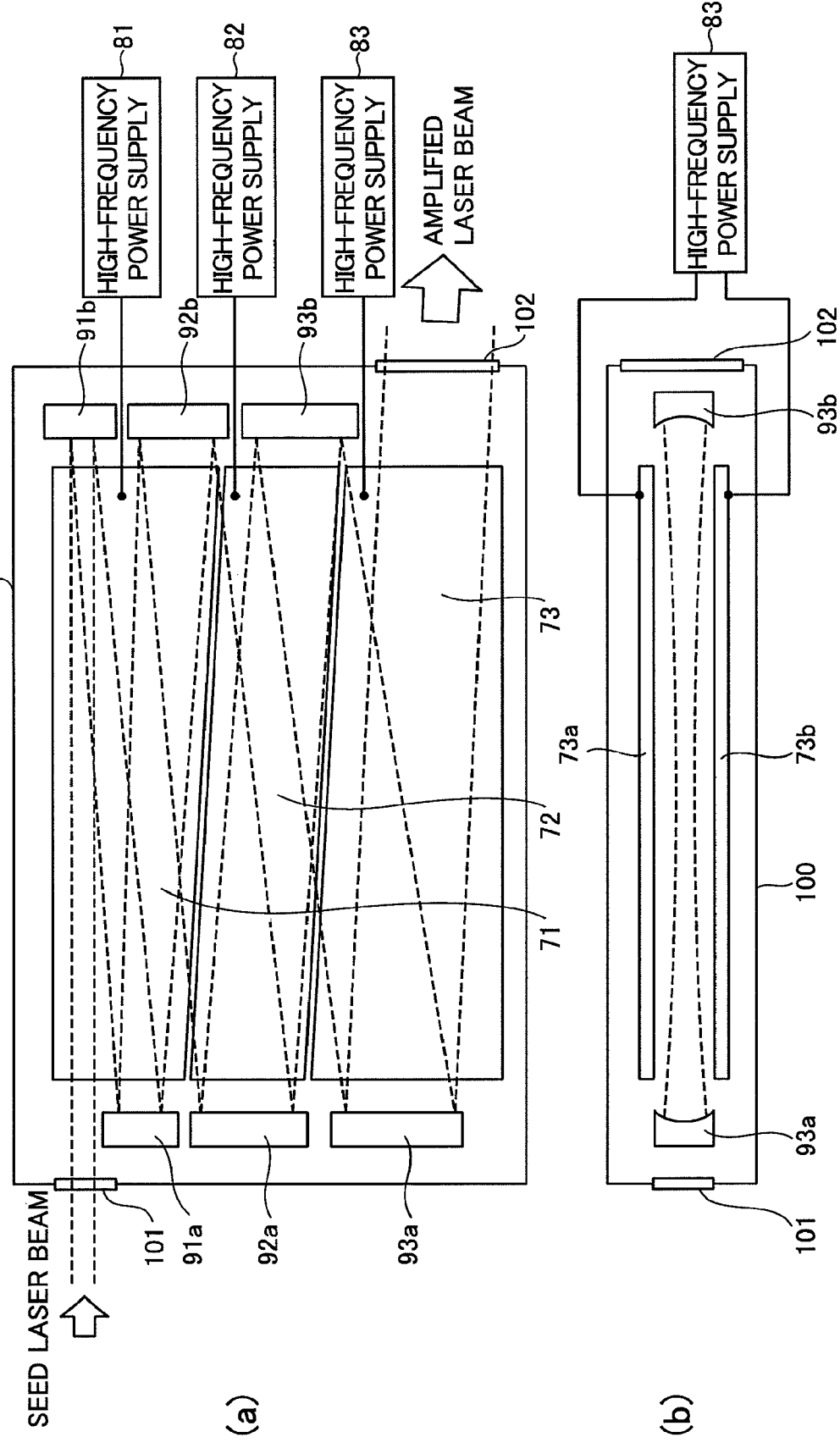
FIG. 18 shows an internal structure of the slab type laser amplifier shown in FIG. 17.

FIG. 18 shows an internal structure of the slab type laser amplifier shown in FIG. 17. FIG. 18 (*a*) is a plan view, and FIG. 18 (*b*) is a side view. As shown in FIG. 18, the slab type laser amplifier 61*a* includes a chamber 100 having a first window 101 and a second window 102 and filled with a gas containing a laser medium, plural pairs of electrodes 71-73 (73*a* and 73*b*) provided facing each other within the chamber 100, for exciting the laser medium in plural discharge regions formed by application of a high-frequency voltage to amplify a pulse laser beam, high-frequency power supplies 81-83 for respectively applying the high-frequency voltage to the electrodes 71-73, and plural mirrors provided within the chamber 100, for multiple-reflecting the pulse laser beam entering from the first window 101 to propagate the pulse laser beam within the discharge region and outputting the pulse laser beam from the second window 102. In FIG. 18, confocal cylindrical mirrors 91*a*-93*a* and 91*b*-93*b* are used as the plural mirrors. In the embodiment, the example of providing confocal cylindrical mirrors for multipass amplification of the pulse laser beam has been shown, however, the present invention is not limited to the embodiment but multipass amplification may be realized by providing common flat mirrors or spherical mirrors.

As described above, the divided electrodes are used in the embodiment, and the upper and lower electrodes are divided in the same manner. The laser control unit 30 shown in FIG. 17 sequentially or simultaneously activates plural trigger signals based on the timing at which burst oscillation is performed by the laser oscillator 10 and/or the timing at which the pulse laser beam is generated by the laser oscillator 10, and respectively supplies those trigger signals to the high-frequency supplies 81-83 of the slab type laser amplifier 61*a*, so that the pulse laser beam entering from the first window 101 is sequentially amplified in the plural discharge regions. The laser control unit 30 raises RF voltages to be applied to the respective pairs of electrodes only at the amplification time.

In this way, the driver laser system according to the present invention can be realized by using the slab type laser amplifier having a longer optical path. In this case, the number of amplifiers can drastically be reduced, and the cooling efficiency of the entire system is improved. Thereby, the power consumption can be further reduced, and the footprint can be reduced. For example, as shown in FIG. 17, when the system is configured by about three amplifiers, the output equal to that of the conventional system including about five to six FAFs can be obtained.

Next, the fifth embodiment of the present invention will be explained.

Figure 19:
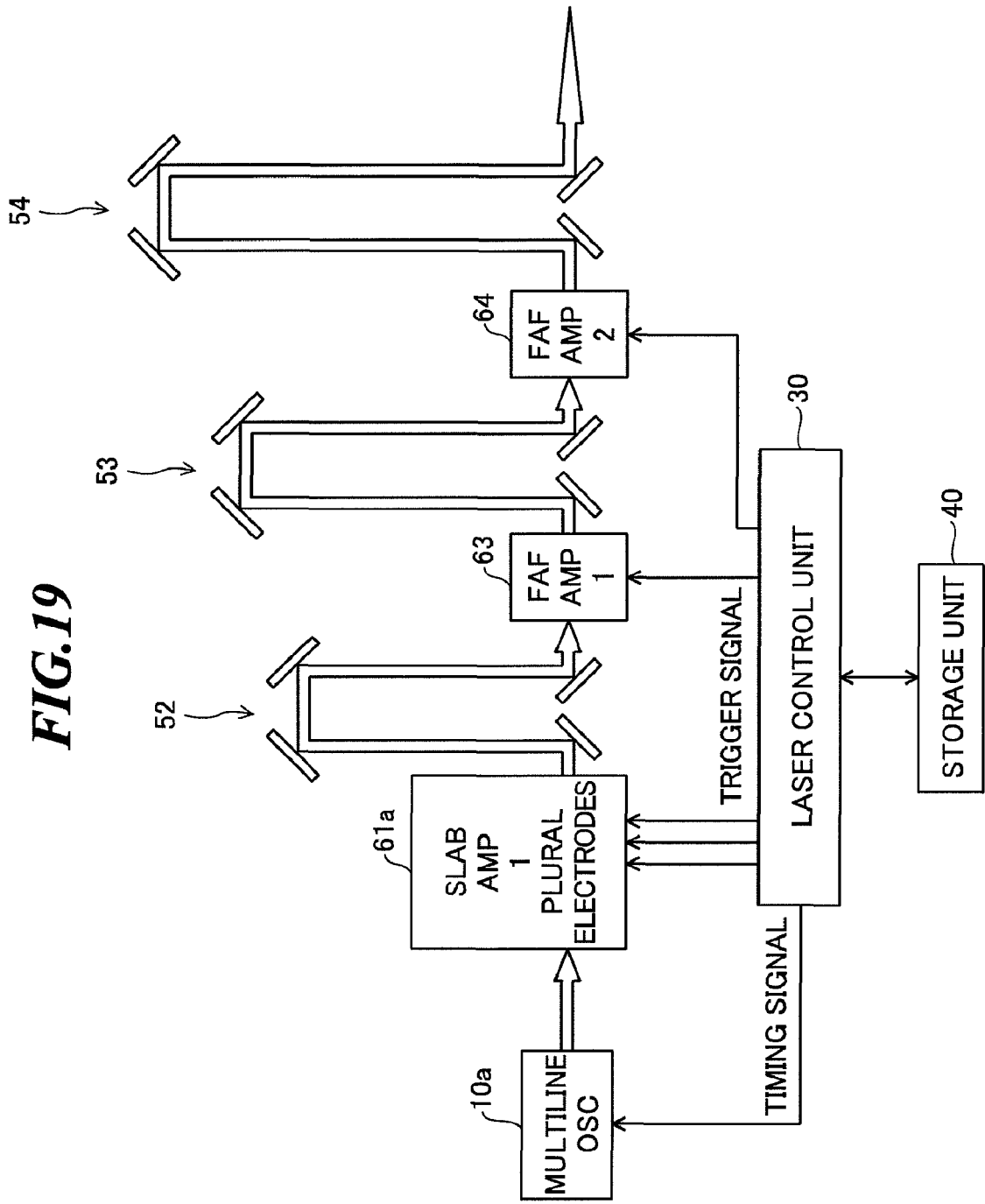
FIG. 19 is a schematic diagram showing an overview of a driver laser system according to the fifth embodiment of the present invention.
Figure 20:
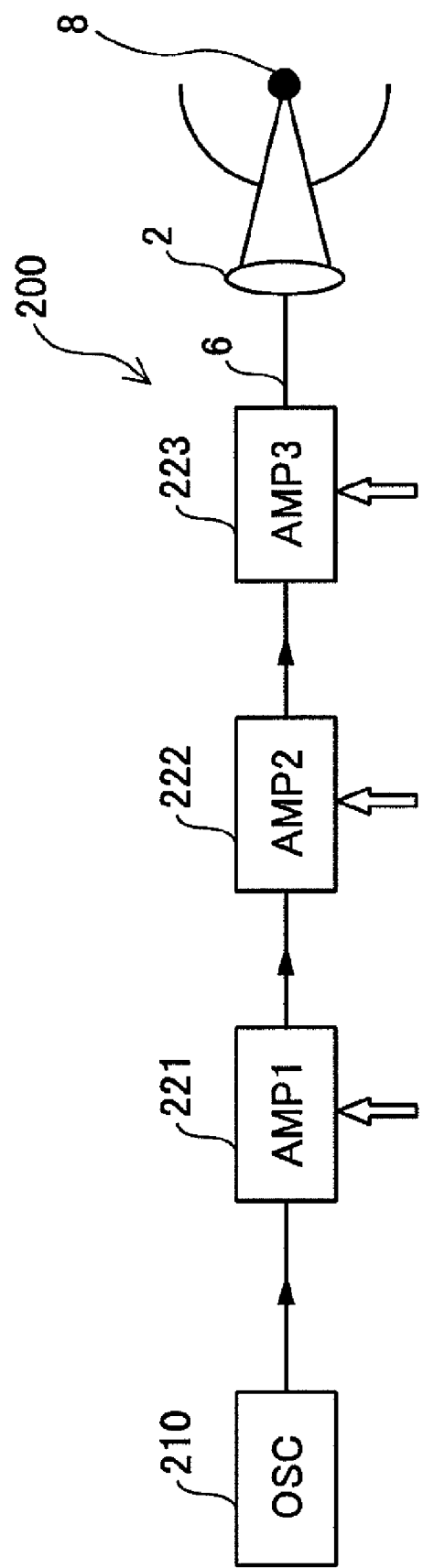
FIG. 20 is a schematic diagram showing a configuration of a conventional driver laser system.
Figure 21:
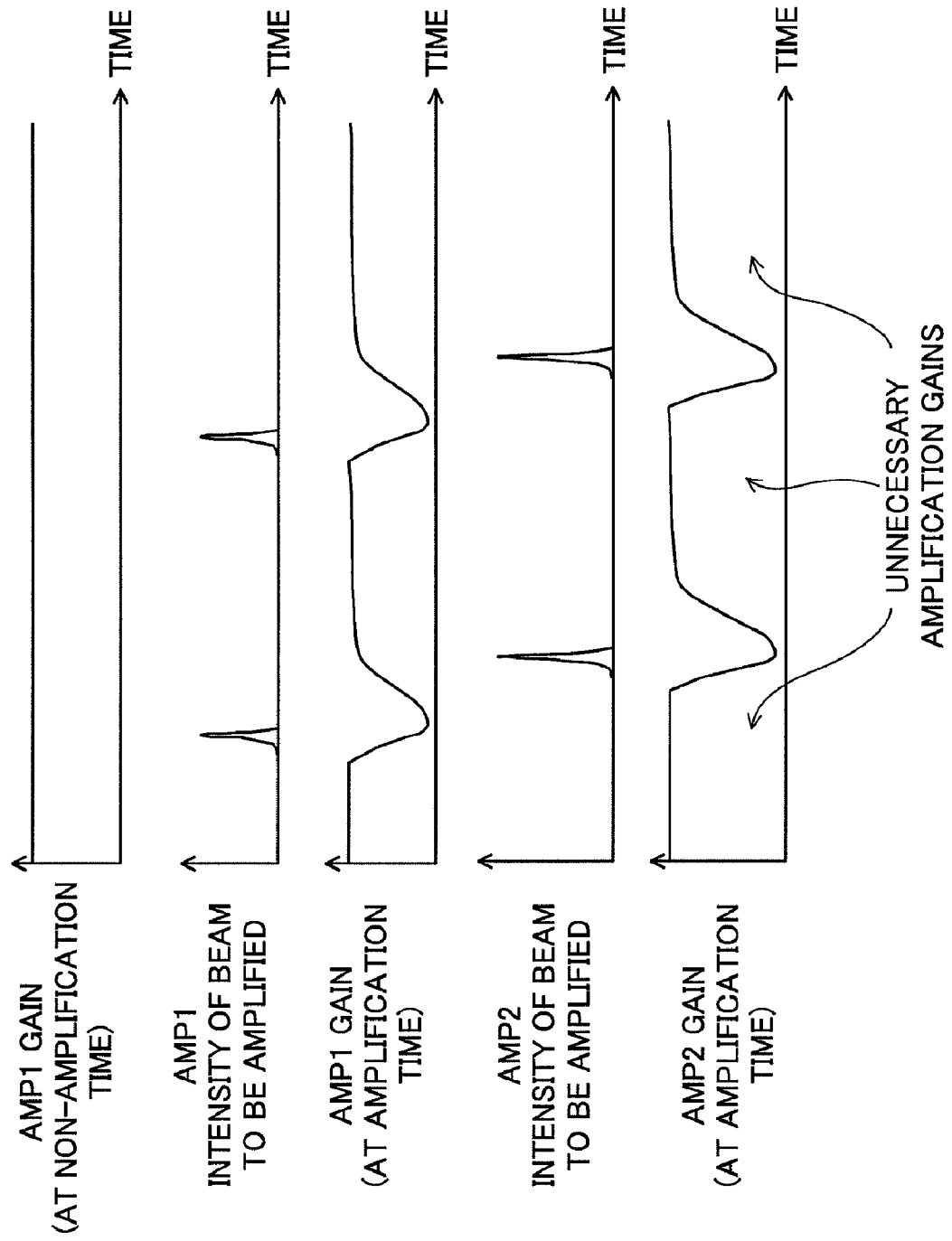
FIG. 21 shows changes in amplification gains over time in a driver laser system using $CO_2$ lasers as amplifiers according to high-frequency discharge.

FIG. 19 is a schematic diagram showing an overview of a driver laser system according to the fifth embodiment of the present invention. In the fifth embodiment, as a technique for improving the amplification efficiency, multiline amplification is performed by using a laser oscillator (multiline OSC) 10*a* for outputting plural spectrum components.

According to the multiline amplification, plural spectrum components are simultaneously amplified so that the amplification gain can be used efficiently for the amplification of pulse laser beam. This means that there is little excessive gain in the amplifier, and both the suppression effect of self-oscillation and the suppression effect of return light can be improved. Further, the amplification efficiency is improved by the multiline configuration, and the outputs of amplifiers may be lower.

As a specific example of multiline amplification of a $CO_2$ laser, there is a method of using quantum cascade lasers for laser oscillation at the same wavelengths as those of plural amplification lines of the $CO_2$ laser as the laser oscillator (OSC). Plural single longitudinal mode quantum cascade lasers are oscillated at the same wavelengths as those of the respective amplification lines. The laser beams outputted from those quantum cascade lasers are synthesized by a grating or the like, and the pulse laser beam is amplified by a regenerative amplifier using a $CO_2$ laser gas as a medium. Then, the pulse laser beam is amplified by the multiple amplifiers to have higher power as in the embodiment, and the on/off control of the amplifiers is optimized, and thereby, energy can be saved.

In the above description, the embodiments in which plural amplifiers are provided in series from the laser oscillator have been explained, however, the present invention is not limited to the embodiments but the technology of the present invention can be applied to the case where the beam outputted from the laser oscillator is split into two, and plural amplifiers are respectively provided in the split plural optical paths (beam lines). Specifically, control of amplifiers in synchronization with the burst oscillation or control of amplifiers in synchronization with the generation of pulse laser beam can be performed in the respective beam lines. Further, on the other hand, it is obvious that the technology of the present invention can be applied to the case where pulse laser beams outputted from plural laser oscillators are synthesized and multiple amplifiers are provided in the beam line thereof.

In the above embodiments, the driver laser systems for EUV light source apparatus have been explained as examples, however, the laser system according to the present invention can be used as a light source of laser machining equipment or the like that requires a short-pulse high-power $CO_2$ laser.

The invention claimed is:

1. A driver laser system to be used in an extreme ultra violet light source apparatus for generating extreme ultra violet light by applying a laser beam to a target material and generating plasma, said system comprising:

a laser oscillator for generating a pulse laser beam by laser oscillation;

plural amplifiers for sequentially inputting the pulse laser beam generated by said laser oscillator and amplifying the pulse laser beam; and control means for controlling said laser oscillator to generate the pulse laser beam and controlling said plural amplifiers to sequentially amplify the pulse laser beam generated by said laser oscillator in a burst oscillation period, and for controlling at least one of said plural amplifiers so as to halt or suppress an amplification operation in a burst halt period between burst oscillation periods.

2. The driver laser system according to claim 1, wherein said control means simultaneously activates and simultaneously deactivates plural trigger signals for respectively controlling amplification operations of said plural amplifiers.

3. The driver laser system according to claim 1, wherein said control means simultaneously activates and simultaneously deactivates plural trigger signals for respectively controlling amplification operations of a predetermined number of downstream amplifiers of said plural amplifiers.

4. A driver laser system to be used in an extreme ultra violet light source apparatus for generating extreme ultra violet light by applying a laser beam to a target material and generating plasma, said system comprising:
   a laser oscillator for generating a pulse laser beam by laser oscillation;
   plural amplifiers for sequentially inputting the pulse laser beam generated by said laser oscillator and amplifying the pulse laser beam; and
   control means for controlling said laser oscillator to generate the pulse laser beam and controlling said plural amplifiers to sequentially amplify the pulse laser beam generated by said laser oscillator in a repeated oscillation period, and for controlling at least one of said plural amplifiers so as to halt or suppress an amplification operation in an oscillation halt period between repeated oscillation periods.

5. The driver laser system according to claim 4, wherein said control means sequentially activates and sequentially deactivates plural trigger signals for respectively controlling amplification operations of said plural amplifiers based on timing at which the pulse laser beam is generated by said laser oscillator.

6. The driver laser system according to claim 5, wherein said control means activates a first one of said plural trigger signals, and activates a second one of said plural trigger signals while keeping the first one of said plural trigger signals activated.

7. The driver laser system according to claim 4, wherein said control means sequentially activates and simultaneously deactivates plural trigger signals for respectively controlling amplification operations of said plural amplifiers based on timing at which the pulse laser beam is generated by said laser oscillator.

8. The driver laser system according to claim 4, wherein said control means simultaneously activates and sequentially deactivates plural trigger signals for respectively controlling amplification operations of said plural amplifiers based on timing at which the pulse laser beam is generated by said laser oscillator.

9. The driver laser system according to claim 4, wherein said control means simultaneously activates and simultaneously deactivates plural trigger signals for respectively controlling amplification operations of said plural amplifiers based on timing at which the pulse laser beam is generated by said laser oscillator.

10. The driver laser system according to claim 4, wherein said control means sequentially activates and sequentially deactivates plural trigger signals for respectively controlling amplification operations of a predetermined number of downstream amplifiers of said plural amplifiers based on timing at which the pulse laser beam is generated by said laser oscillator.

11. The driver laser system according to claim 10, wherein said control means activates a first one of said plural trigger signals, and activates a second one of said plural trigger signals while keeping the first one of said plural trigger signals activated.

12. The driver laser system according to claim 4, wherein said control means sequentially activates and simultaneously deactivates plural trigger signals for respectively controlling amplification operations of a predetermined number of downstream amplifiers of said plural amplifiers based on timing at which the pulse laser beam is generated by said laser oscillator.

13. The driver laser system according to claim 4, wherein said control means simultaneously activates and sequentially deactivates plural trigger signals for respectively controlling amplification operations of a predetermined number of downstream amplifiers of said plural amplifiers based on timing at which the pulse laser beam is generated by said laser oscillator.

14. The driver laser system according to claim 4, wherein said control means simultaneously activates and simultaneously deactivates plural trigger signals for respectively controlling amplification operations of a predetermined number of downstream amplifiers of said plural amplifiers based on timing at which the pulse laser beam is generated by said laser oscillator.

15. The driver laser system according to claim 1, wherein said control means controls oscillation of said laser oscillator and generates plural trigger signals for respectively controlling amplification operations of said plural amplifiers based on timing information stored in a storage unit.

16. The driver laser system according to claim 1, wherein said control means controls oscillation of said laser oscillator and generates plural trigger signals for respectively controlling amplification operations of said plural amplifiers based on an exposure timing signal supplied from an exposure unit.

17. The driver laser system according to claim 1, further comprising:
   mirrors arranged downstream of one of said plural amplifiers so as to form an optical path, for delaying a pulse laser beam ouputted from said one of said plural amplifiers and outputting a delayed pulse laser beam.

18. The driver laser system according to claim 1, wherein said plural amplifiers include at least one of a slab type laser amplifier, an orthogonal axial flow type laser amplifier, and a triaxial orthogonal type laser amplifier.

19. The driver laser system according to claim 18, wherein said plural amplifiers include a laser amplifier having a pair of electrodes arranged in contact with a laser gas, for high-frequency discharge, and a high-frequency power supply for supplying a high-frequency voltage to said pair of electrodes, said laser amplifier exciting the laser gas in a discharge region formed by supplying the high-frequency voltage to said pair of electrodes so as to amplify the pulse laser beam, wherein an amplification operation of said laser amplifier is controlled by controlling said high-frequency power supply.

20. The driver laser system according to claim 19, wherein said control means sequentially activates plural trigger signals based on timing at which the pulse laser beam is generated by said laser oscillator and respectively supplies said plural trigger signals to high-frequency power supplies of plural laser amplifiers, and thereby, the pulse laser beam is sequentially amplified in discharge regions within laser gases of said plural laser amplifiers.

21. The driver laser system according to claim 19, wherein said laser oscillator includes a multiline laser oscillator for oscillating at wavelengths of plural amplification lines of the laser gas.

22. The driver laser system according to claim 19, wherein said laser gas includes a $CO_2$ laser gas.

23. The driver laser system according to claim 22, wherein said laser oscillator includes at least one quantum cascade laser for oscillating at wavelengths of plural amplification lines of the $CO_2$ laser gas.

24. A laser system comprising:

a laser oscillator for generating a pulse laser beam by laser oscillation;

plural amplifiers for sequentially inputting the pulse laser beam generated by said laser oscillator and amplifying the pulse laser beam; and control means for controlling said laser oscillator to generate the pulse laser beam and controlling said plural amplifiers to sequentially amplify the pulse laser beam generated by said laser oscillator in a burst oscillation period, and for controlling at least one of said plural amplifiers so as to halt or suppress an amplification operation in a burst halt period between burst oscillation periods.

25. A laser system comprising:

a laser oscillator for generating a pulse laser beam by laser oscillation;

plural amplifiers for sequentially inputting the pulse laser beam generated by said laser oscillator and amplifying the pulse laser beam; and control means for controlling said laser oscillator to generate the pulse laser beam and controlling said plural amplifiers to sequentially amplify the pulse laser beam generated by said laser oscillator in a repeated oscillation period, and for controlling at least one of said plural amplifiers so as to halt or suppress an amplification operation in an oscillation halt period between repeated oscillation periods.

* * * * *